US007876197B2

(12) United States Patent
Ehrman et al.

(10) Patent No.: US 7,876,197 B2
(45) Date of Patent: Jan. 25, 2011

(54) MOBILE ASSET DATA MANAGEMENT SYSTEM

(75) Inventors: Kenneth S. Ehrman, New York, NY (US); Michael L. Ehrman, New York, NY (US); Jeffrey M. Jagid, Closter, NJ (US); Joseph M. Pinzon, Bronx, NY (US); Yaron Hecker, New York, NY (US); Leonard Pimentel, Newfoundland, NJ (US)

(73) Assignee: I.D. Systems, Inc., Hackensack, NJ (US)

( * ) Notice: Subject to any disclaimer, the term of this patent is extended or adjusted under 35 U.S.C. 154(b) by 627 days.

(21) Appl. No.: 11/986,997

(22) Filed: Nov. 28, 2007

(65) Prior Publication Data

US 2008/0140482 A1   Jun. 12, 2008

Related U.S. Application Data

(60) Division of application No. 10/426,173, filed on Apr. 28, 2003, now Pat. No. 7,656,271, which is a continuation-in-part of application No. 10/043,361, filed on Jan. 9, 2002, now Pat. No. 7,356,494, which is a continuation-in-part of application No. 09/804,909, filed on Mar. 13, 2001, now Pat. No. 6,898,493, which is a continuation-in-part of application No. 09/315,071, filed on May 19, 1999, now abandoned.

(51) Int. Cl.
*G06F 7/04* (2006.01)
*G06F 7/00* (2006.01)
*G06Q 20/00* (2006.01)
*G05D 1/00* (2006.01)

(52) U.S. Cl. ................. 340/5.8; 340/5.74; 705/64; 705/22; 701/1; 701/36

(58) Field of Classification Search ............. None
See application file for complete search history.

(56) References Cited

U.S. PATENT DOCUMENTS 3,705,976 A   12/1972   Platzman
4,303,904 A   12/1981   Chasek (Continued)

FOREIGN PATENT DOCUMENTS

EP   0 851 701   7/1998

(Continued)

OTHER PUBLICATIONS

International Search Report mailed Oct. 24, 2005.
Supplementary European Search Report dated Mar. 23, 2010 for related European Application No. EP03713222.2.

*Primary Examiner*—F. Ryan Zeender
*Assistant Examiner*—Mussa Shaawat
(74) *Attorney, Agent, or Firm*—Troutman Sanders LLP; James E. Schutz; Robert R. Elliott, Jr.

(57) ABSTRACT

Methods and systems for preventing unauthorized use of a mobile asset are described. The method for providing access to the mobile asset can include providing a control device on the mobile asset. The control device is in communication with the mobile asset to selectively control whether the mobile asset is enabled for operation. The method also includes storing data in the control device that identifies a group of potential operators who are permitted to operate that mobile asset. This stored data includes unique password data for each potential operator in the permitted group. Further, the method includes receiving an identifier and password from an accessing operator and comparing by the control device of the received identifier to the stored data to order confirm that the accessing operator is a potential operator. Moreover, the method includes comparing by the received password to the stored data in order to confirm that the password matches the unique password data, and, if the comparisons are satisfied, controlling the mobile asset to be enabled for operation by the accessing operator.

20 Claims, 29 Drawing Sheets

U.S. PATENT DOCUMENTS

| | | | |
|---|---|---|---|
| 4,338,587 A | 7/1982 | Chiappetti | |
| 4,398,172 A | 8/1983 | Carroll et al. | |
| 4,438,491 A | 3/1984 | Constant | |
| 4,549,264 A | 10/1985 | Carroll et al. | |
| 4,603,390 A | 7/1986 | Mehdipour et al. | |
| 4,656,463 A | 4/1987 | Anders et al. | |
| 4,688,026 A | 8/1987 | Scribner et al. | |
| 4,908,500 A | 3/1990 | Baumberger | |
| 4,937,581 A | 6/1990 | Baldwin et al. | |
| 5,086,389 A | 2/1992 | Hassett et al. | |
| 5,089,974 A | 2/1992 | Demeyer et al. | |
| 5,101,200 A | 3/1992 | Swett | |
| 5,119,104 A | 6/1992 | Heller | |
| 5,151,684 A | 9/1992 | Johnsen | |
| 5,166,872 A | 11/1992 | Weaver et al. | |
| 5,192,954 A | 3/1993 | Brockelsby et al. | |
| 5,204,670 A | 4/1993 | Stinton | |
| 5,204,675 A | 4/1993 | Sekine | |
| 5,206,643 A | 4/1993 | Eckelt | |
| 5,218,344 A | 6/1993 | Ricketts | |
| 5,253,162 A | 10/1993 | Hassett | |
| 5,257,393 A | 10/1993 | Miller | |
| 5,281,859 A | 1/1994 | Crane | |
| 5,287,353 A | 2/1994 | Buda et al. | |
| 5,289,369 A | 2/1994 | Hirshberg | |
| 5,295,244 A | 3/1994 | Dev et al. | |
| 5,303,343 A | 4/1994 | Ohya et al. | |
| 5,321,584 A | 6/1994 | Matheny | |
| 5,327,144 A | 7/1994 | Stilp et al. | |
| 5,396,215 A | 3/1995 | Hinkle | |
| 5,426,425 A | 6/1995 | Conrad et al. | |
| 5,682,142 A | 10/1997 | Loosmore et al. | |
| 5,715,905 A | 2/1998 | Kaman | |
| 6,006,148 A | 12/1999 | Strong | |
| 6,141,610 A | 10/2000 | Rothert et al. | |
| 6,150,921 A | 11/2000 | Werb et al. | |
| 6,430,488 B1 | 8/2002 | Goldman et al. | |
| 6,476,763 B2 | 11/2002 | Allen, Jr. | |
| 6,539,393 B1 | 3/2003 | Kabala | |
| 6,609,082 B2 | 8/2003 | Wagner | |
| 6,614,349 B1 | 9/2003 | Proctor et al. | |
| 6,710,738 B2 | 3/2004 | Allen, Jr. | |
| 6,924,748 B2 | 8/2005 | Obradovich et al. | |
| 6,952,680 B1 | 10/2005 | Melby et al. | |
| 2001/0005178 A1 | 6/2001 | Stewart | |
| 2002/0087345 A1 | 7/2002 | Bly et al. | |
| 2002/0184062 A1 | 12/2002 | Diaz | |
| 2003/0074244 A1 | 4/2003 | Braxton | |
| 2003/0130913 A1 | 7/2003 | Ehrman et al. | |
| 2003/0195825 A1 | 10/2003 | Ehrman et al. | |
| 2003/0216976 A1 | 11/2003 | Ehrman et al. | |
| 2003/0225707 A1 | 12/2003 | Ehrman et al. | |
| 2004/0015419 A1 | 1/2004 | Ehrman et al. | |
| 2004/0204867 A1 | 10/2004 | Smith et al. | |

FOREIGN PATENT DOCUMENTS

| | | |
|---|---|---|
| EP | 1 113 628 | 7/2001 |
| WO | 00/70530 | 11/2000 |
| WO | WO 01/05175 | 1/2001 |
| WO | 01/11473 | 2/2001 |
| WO | 01/37121 | 5/2001 |

MOBILE ASSET DATA MANAGEMENT SYSTEM

CROSS-REFERENCE TO RELATED APPLICATIONS

This application is a divisional of U.S. patent application Ser. No. 10/426,173, filed Apr. 28, 2003, which is a continuation-in-part of U.S. patent application Ser. No. 10/043,361 filed Jan. 9, 2002, which is a continuation-in-part of U.S. patent application Ser. No. 09/804,909, filed Mar. 13, 2001 (now U.S. Pat. No. 6,898,493), which is a continuation-in-part of U.S. patent application Ser. No. 09/315,071 filed May 19, 1999, now abandoned.

BACKGROUND OF THE INVENTION

1. Technical Field of the Invention

The principles of the present invention are generally directed to an asset management system, and, more specifically, but not by way of limitation, to a vehicle control system and method using a wireless architecture control access to a vehicle.

2. Description of Related Art

The main assets of a business organization include buildings, equipment, people, money and data. Data assets are acquired, used, and maintained in the same manner as any other asset, and might include information regarding the other assets. Such assets can be mobile or fixed, tangible or intangible assets. Fixed assets may include equipment (e.g., manufacturing equipment), buildings, and fixtures. Mobile assets may include battery-powered or unpowered machines, such as forklifts, cars, boats, airplanes, loading equipment, railroad cars, and even small parcels, containers, letters, and even people. It should be understood that fixed and mobile assets may be personal, commercial, and/or military assets. Businesses must "manage" such assets to accomplish their business purposes.

The management of such assets includes financial, accounting, marketing, and regulatory issues, to name a few, related to the use of such assets for a particular business. Asset management systems facilitate the use of such assets for directing or carrying on such business and, as such, are evaluated in the context of a specific business. For example, package delivery companies are often interested in determining the location of its fleet of trucks so that the package delivery company may easily determine the time of arrival of the trucks. Car rental companies, too, are interested in determining exact locations of their vehicles for inventory purposes. Still yet, warehousing companies are interested in determining locations of particular mobile assets, such as forklifts and containers. Additionally, companies that utilize mobile assets, such as forklifts, are interested in providing access control to the mobile assets so that only those employees authorized to utilize the mobile assets may do so. Thus, asset management systems utilize different databases depending on the nature of the business and industry, which define the data elements for each database. Regardless of the variety of databases, asset management systems require robust communications systems to ensure that all of the data defined by the business is created, stored, processed and updated according to the mandates and specifications of that business.

Wireless communications systems have permeated all aspects of asset management systems and have become a prevalent tool in a variety of consumer and industrial applications worldwide. Such wireless communications systems include mobile telephones, satellite television, citizen-band radios, remote computer networking, wireless local area networks (LANs), and remote wireless devices. Typically, wireless communications systems, including those for asset management systems, include a central computing system coupled with a wireless infrastructure that communicates with multiple wireless devices associated with specific assets, i.e., an asset communicator. Conventional design methodology for the wireless communications systems requires that the asset communicator have an active communication link through the wireless infrastructure to the central computing system in order to operate and perform functions associated with the asset management system. In other words, without the communication links between the asset communicator, wireless infrastructure, and the central computing system, the asset communicator is either inoperative or not fully operative. Moreover, if either (i) the communication link between the central computing system and wireless infrastructure or (ii) the link between the wireless infrastructure and the asset communicator is not operating properly, many features of the asset communicator become inoperative. A useful asset management system must continue to manipulate the data as described above regardless of the loss or intermittent operation of the communication links and, therefore, requires a wireless communication architecture that facilitates the manipulation of this data. For example, an asset management system for vehicles might include access control data for authorized operators. However, as previously discussed, conventional communications systems utilized for asset management purposes require a communication link be established between the asset communicator and the central computing system. Hence, the asset management system must utilize a wireless communication architecture that is not fully dependent upon instantaneous or active communication between the central computer and the asset communicators.

As indicated above, asset management systems and their associated wireless communications systems are developed and operated in the context of a specific business to resolve specific business problems. Continuing with the example of a mobile asset or vehicle (e.g. a forklift) and an asset communicator attached to the vehicle that processes access control for the vehicle, a manager of a fleet of vehicles is generally interested in assuring that the vehicles are operated by a group of employees having the approval to do so at certain times of the day and on certain days of the week to generate a list of "approved operators" that have access to a vehicle at a specific time. Thus, the asset management system includes a database of the approved operators that is checked when the operator logs in and starts the vehicle. Because conventional wireless communications systems rely on the communication link between the asset communicator and the central computing system, the database of the approved operators is maintained at the central computing system and accessed in the event of a login request to verify and grant access by the operator.

In the case of tracking vehicles, the business goal is to determine not only the precise location of the vehicle, but also the route that the vehicle traveled to reach a particular location. Utilizing asset communicators that require an active link between the mobile wireless device and the central computing system becomes problematic for these and other particular business issues due to frequent or infrequent failures of any link between the asset communicator and the central computing system. Because of the communication link failures, essential location data for the assets is lost. Additionally, utilizing a conventional communications system, tracking the traveled route of the asset requires that the asset communicates with the wireless infrastructure at a relatively high frequency so that the central computer system can determine location and path traveled of the asset. This technique of determining position and path traveled, however, presents a significant limitation in terms of system bandwidth and computing capacity. In the case of the asset communicator having global positioning system (GPS) capability, the transmission of position from the asset communicator is still problematic for system bandwidth and, potentially, communication fee-related reasons. If, for example, a communications system utilizes a GPS and cellular combination solution, the cost of continuous communication updates includes a cellular telephone call for each location update.

One reason for the high frequency of transmission is due to conventional asset management systems utilizing "dumb" terminals (i.e., asset communicators) that communicate information with the wireless infrastructure and require that the central computing system perform computational duties as the "dumb" terminal does not have decision making capability. Utilizing a "dumb" terminal becomes even more problematic in that if many assets reside in a small area, the communication bandwidth between the mobile wireless devices and the wireless infrastructure is degraded to the point that the business problems, such as access control and position tracking, are simply incapable of truly being solved.

SUMMARY OF THE INVENTION

To overcome the problems of wireless communications systems being incapable of effectively solving business problems due to, for example, (i) requiring wireless mobile devices to have an active link to both a wireless infrastructure and a central computing system, (ii) utilizing "dumb" terminals having communication capabilities only, and (iii) having the central computing system determine location of the wireless mobile device, a robust wireless communications system has been developed. The robust wireless communications system allows for "intelligent" mobile wireless devices (e.g., asset communicators) to make decisions, typically without interaction with the wireless infrastructure and/or central computing system. By not requiring an active link between the mobile wireless devices and the central computing system via the wireless infrastructure, the system may be utilized to solve business problems that demand real-world flexibility and are substantially fault tolerant.

The system according to the principles of the present invention provides for information stored by the central computing system to be downloaded to the wireless infrastructure. The wireless infrastructure includes a computing system for maintaining and transmitting the information to the mobile wireless devices. The downloading and transmitting of the information from the central computing system, wireless infrastructure, and mobile wireless device is performed sequentially, but not necessarily simultaneously or even substantially simultaneously. By allowing the wireless infrastructure to maintain and transmit the information without an active link to the central computing system, the robustness of the wireless communications system is increased.

In the uplink direction, information, such as positioning, time of use, and fuel level, measured by the mobile wireless devices may be stored and processed by the mobile wireless devices until a communication link to the wireless infrastructure becomes established. The uplink information may be stored by the wireless infrastructure until a communication link is established with the central computing system. Also, the data may be determined unnecessary by the mobile wireless device, and may thus be discarded, thereby dramatically eliminating the need for storage or transmission. By providing for sequential, non-simultaneous communication of downlink and uplink information, the information may be maintained within the robust wireless communications system without being affected by system communication failure. The downlink and uplink communication techniques and the use of intelligent mobile wireless devices allow for many previously insolvable business problems to be solved.

BRIEF DESCRIPTION OF THE DRAWINGS

A more complete understanding of the method and apparatus of the present invention may be obtained by reference to the following Detailed Description when taken in conjunction with the accompanying Drawings wherein.

LIST OF TABLES

Figure 1:
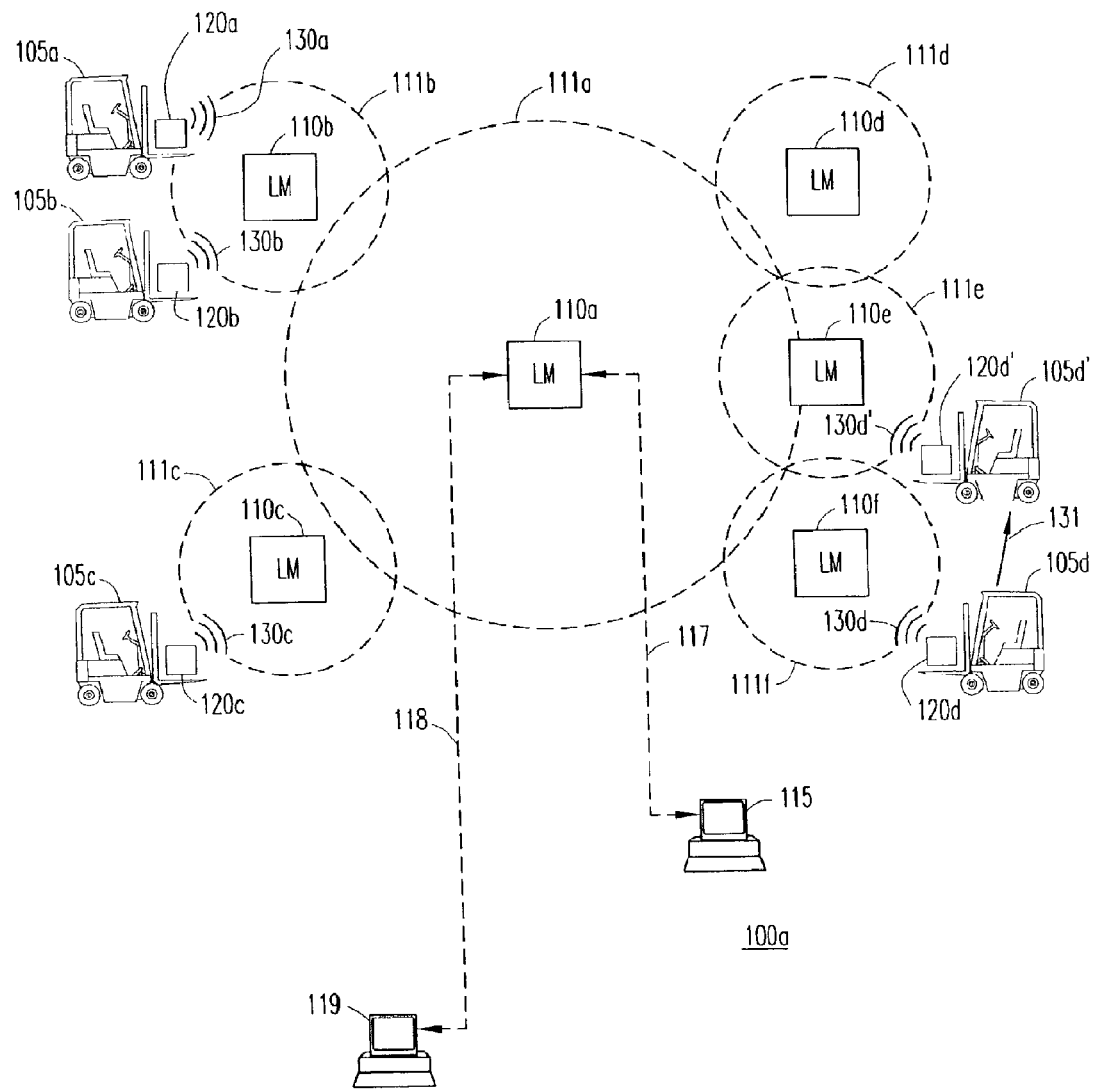
FIG. 1 is an exemplary block diagram of a robust wireless communications system for performing asset management according to the principles of the present invention.

TABLE 1. Vehicle Information;
TABLE 2. Operator Information;
TABLE 3. Group Information;
TABLE 4. Vehicle Utilization Information;
TABLE 5. Vehicle Location Information;
TABLE 6A. OSHA Question List Details;
TABLE 6B. Vehicle Profile Information;
TABLE 7. Low Battery Information; and
TABLE 8. Impact Information.

DETAILED DESCRIPTION OF THE EXEMPLARY EMBODIMENTS OF THE INVENTION

Asset management and tracking has become an important issue for large and small companies due to financial considerations, customer concerns, and governmental regulations, for example. Technology in the fields of information technology (IT) and telecommunications has evolved to enable robust wireless communications to perform asset management, especially in a variety of aspects that solve business problems that do not necessarily require instantaneous or active communication between a central computer and an asset (i.e., mobile or fixed). As even the most stable communications networks tend to fail, depending on the particular asset management application, failure of the communications network may severely disrupt business operations. Additionally, communications networks may be bandwidth and/or cost prohibitive for many asset management applications.

The principles of the present invention provide for a robust wireless communications system that performs asset management of mobile and/or fixed assets. The robust wireless communications system accounts for network failures and throughput issues by providing intelligence in both the wireless infrastructure and mobile wireless devices (e.g., asset communicators) associated with the assets. By including intelligence in the wireless infrastructure and asset communicators, the assets may remain substantially operational even in the event of a communication link failure between the central computer and the wireless infrastructure and/or between the wireless infrastructure and the asset communicator(s). Additionally, an asset that becomes out-of-range of the wireless infrastructure may still perform intended duties and utilize the associated asset communicator to perform the asset management functions. Furthermore, by incorporating intelligence into the wireless infrastructure and asset communicators, business decisions can be made that are simply not possible without such intelligent devices, often without transmitting any data.

The robust wireless communications system is capable of distributing downlink data utilized in performing the asset management functionality in a sequential, but not necessarily simultaneous, transmission from the central computing system to the wireless infrastructure and from the wireless infrastructure to the asset communicators. In that regard, and in contrast to traditional wireless communications systems, the asset communicators need not have active links between (i) the central computing system and wireless infrastructure, and (ii) the wireless infrastructure and asset communicators for the data to be downloaded to the asset communicators. Accordingly, the data may be transmitted to the asset communicators by the wireless infrastructure irrespective of the communication link between the central computing system and wireless infrastructure. In the uplink direction, the asset communicators are able to receive data from the asset and/or generate data without an active communication link with either the wireless infrastructure and/or the central computer. Upon the communication link between the asset communicator and wireless infrastructure becoming established, the data may be uploaded to the wireless infrastructure, stored therein, and further uploaded from the wireless infrastructure to the central computing system upon a connection being established thereto.

To enable synchronization of the downlink and uplink between the central computing system, wireless infrastructure, and asset communicators, transaction codes may be applied to individual datasets or data records. By applying transaction codes that are temporal (i.e., based on time of creation), the synchronization process may be maintained even if a communication failure occurs during synchronization of the data by determining the transaction codes that exist in the different locations, and continuing synchronizing therefrom. On the downlink communication, the transaction code is used to indicate the most up-to-date data. On the uplink communication, the transaction code is used to create a unique key for ensuring the integrity of data such that the order and uniqueness of each dataset is maintained.

In the central computing system, datasets may be generated by a supervisor or operator who enters new data or edits existing data to download to the asset communicator(s). The asset communicators operate in an intelligent manner by, in general, forming data records based on events or based on receiving data from an operator interfacing with the asset communicator. One example of an event may include a vehicle operator logging on, performing various duties with the vehicle, and logging off. Upon logging off, because the asset communicator is intelligent, a summary of operational information (i.e., dataset) that a customer desires may be generated, applied a transaction code, and stored on the asset communicator. The dataset, including the associated transaction code, may thereafter be transmitted to the wireless infrastructure and/or be used by the asset communicator to make decisions about future transactions (e.g., re-use of previously entered data, such as an OSHA checklist, for future operator(s)).

By the asset communicator summarizing the information rather than periodically transmitting the intermittent information to the wireless infrastructure, (i) the asset management may occur without an active communication link between the asset communicator and the wireless infrastructure, (ii) the bandwidth (and potentially communication cost) of the system may be reduced, (iii) the central computing system need not be overloaded with computational responsibilities that the distributed asset communicators are capable of handling, and (iv) the cost of system components (e.g., asset communicators, communication devices, and infrastructure installation costs) may be reduced due to the amount of memory and communication requirements being reduced. Additionally, and more importantly, the robust communications system may solve many business problems that otherwise could not be solved as the asset communicator and system are capable of performing many, if not all, of the intended business functions on future transactions without either (i) a link between the wireless infrastructure and the asset communicator and/or (ii) a link between the wireless infrastructure and the management computer system.

Robust Wireless Communications System Architecture

FIG. 1 shows an exemplary block diagram of a wireless communications system 100a for an asset management system according to the principles of the present invention, and more specifically, but without limitation, an asset management system for managing forklifts 105a-105d (collectively 105). The robust wireless communications system 100a includes at least one local monitor (LM) 110a-110f (collectively 110) having a wireless unit operative with a communication range defined by the cells 111a-111f, respectively (collectively 111), of various radii, and a management computer network 115, configured in a central or distributed processing configuration, coupled to the local monitors 110 via a local communication link 117. For the local monitor to communicate with the management computer network 115, communication equipment (see, FIG. 2, units 230a-230c) is utilized.

The local monitors 110 may be coupled to the management computer network 115 as shown by the local monitor 110a, or indirectly through a local supervisory computer (not shown) operating as a monitor to the management computer network 115. The cells 111 of the local monitors 110 may overlap (as shown by the cells 111d-111f) or not (as shown by the cells 111b-111c) depending on the particular business needs and the space to be monitored. When more than one local monitor 110 is utilized, they may be positioned to cover a larger and/or more asymmetric service area as defined by the particular needs of the business. For example, a multiple cell 111 structure may be designed to cover all the areas of a manufacturing facility that might be visited by a forklift 105, including both permissible and prohibited areas for a particular forklift operator. The local monitors 110 have the ability to use directional antennas, as understood in the art, and/or dynamically change coverage range to cover certain areas. To dynamically change coverage range, the local monitors 110 may be software controlled to adjust transmission power. In one embodiment, a variable attenuator may be utilized to reduce the amount of output power from a local monitor. The adjustment of coverage range may be utilized to further refine the location of assets. In another embodiment, a local monitor near a door, such as a warehouse loading dock door, may be configured to have a limited communication range for the immediate area in front of the door.

It should be understood that the wireless architecture between the management computer network 115 and the local monitors 110 vary depending on the type of asset being managed for a specific business need. The local monitors 110 also have data processing and storage capability along with its wireless communication equipment. The local monitors 110 may also be coupled via a network communication link 118 to other networks (not shown) such as, for example, the Internet to a webserver 119 or wireless local area network. The webserver 119 may be accessed by a customer renting a vehicle or a manager of certain databases in the asset management system to inspect parameters and operating conditions of the system.

The robust wireless communications system 100a also includes asset communicators 120a-120d (collectively 120), each one associated with a specific asset, and in this embodiment, a forklift 105a-105d, respectively, for communicating with the local monitors 120 via their associated asset communication links 130a-130d (collectively 130), respectively. The asset communication links 130 may be any form of wireless communication link including, without limitation, cellular, radio frequency (RF) (possibly including adjustable range), wireless Ethernet (i.e., the 802.11b wireless communication standard), paging, satellite, or a combination of any of the foregoing. The asset communicators 120 also have data processing and storage capability along with their wireless communication equipment.

In operation, the asset communicators 120 become active for uplinking or downlinking data when it comes within the range of the cell 111 of one of the local monitors 110 to establish the corresponding asset communication link 130 with the local monitor 110. The establishment of the asset communication links 130 is independent of the local communication link 117 for any of the local monitors 110. Each asset communicator (i) identifies the local monitor(s) 110 in communication therewith and (ii) determines what, when, and how often to communicate. To identify the local monitor(s) 110, the asset communicator 120 receives identifier(s) associated with the local monitor(s) 110 and determines the available communication link(s) 130. The data being communicated is dependent on the business problems currently being performed by the asset communicators 110. When and how often to communicate the data may be determined by current operating conditions and/or predetermined rules and system parameters.

Data is uplinked or downlinked between one of the asset communicators 120 and one of the local monitors 110 only when the corresponding forklift 105 moves within the range of the cell 111 of that local monitor 110. For example, when a first forklift 105a moves within the range of the cell 111b, the asset communication link 130a is established between the asset communicator 120a and the local monitor 110b, whereupon data stored on either one of the devices can be uplinked to, or downlinked from, the other device. A second forklift 105b might move within the range of the same cell 111b to establish a similar asset communication link 130b between its asset communicator 120b and the same local monitor 110b. A third forklift 105d might move within the range of the cell 111f to establish a first asset communication link 130d between its asset communicator 120d and the local monitor 110f, and then move out-of-range into the range of the cell 111e as shown by the arrow 131 to establish a second asset communication link 130d' at a later time between the asset communicator 120d' and a second local monitor 110e. An asset communicator 120b may have multiple links open simultaneously with different local monitors 110, and use the best communication link for both uplink and downlink communications.

Referring more specifically to the example of a forklift operator above, in the robust wireless communications system 100a may be a multi-cell system as just described including a database that permits a specific forklift operator to be operating the forklift 105d in an area covered by the local monitor 110f, but prohibits the same operator from driving that forklift to another area covered by the local monitor 110e. This part of the database is stored by the asset communicator 120d setting forth the permissible and prohibited areas of operation for that operator as soon as she identifies herself by logging-in to start the forklift 105d. If she drives the forklift 105d into the range of the cell 111e, the asset communicator 120d' may determine its communication link status and communicate the presence and identification of both the forklift and the operator to the local monitor 110e via the asset communication link 130d'. The asset communicator 120d' may take active measures to alert the operator of the location violation and/or disable the forklift. Alternatively or additionally, the data would then be stored in the memory of local monitor 110e and processed to alert the operator of the violation, shut down the forklift 105d', and/or notify a supervisor of the breach by uplinking the data from the local monitor 110e to the management computer network 115 via the local communication link (not shown), but only when that local communication link is established. As indicated above, the establishment of the asset communication links 130 is independent of the local communication link 117 to the management computer network 115. For example, the database could have been updated by the management computer network 115 to update the database on the local monitor 110e, but not the asset communicator 120d, authorizing the operator to be in the area covered by the cell 111e before the operator entered that area. Upon entering this area, the local monitor 110e would update the asset communicator 120d' so that it would not transmit a breach signal to the local monitor 110e.

Figure 2:
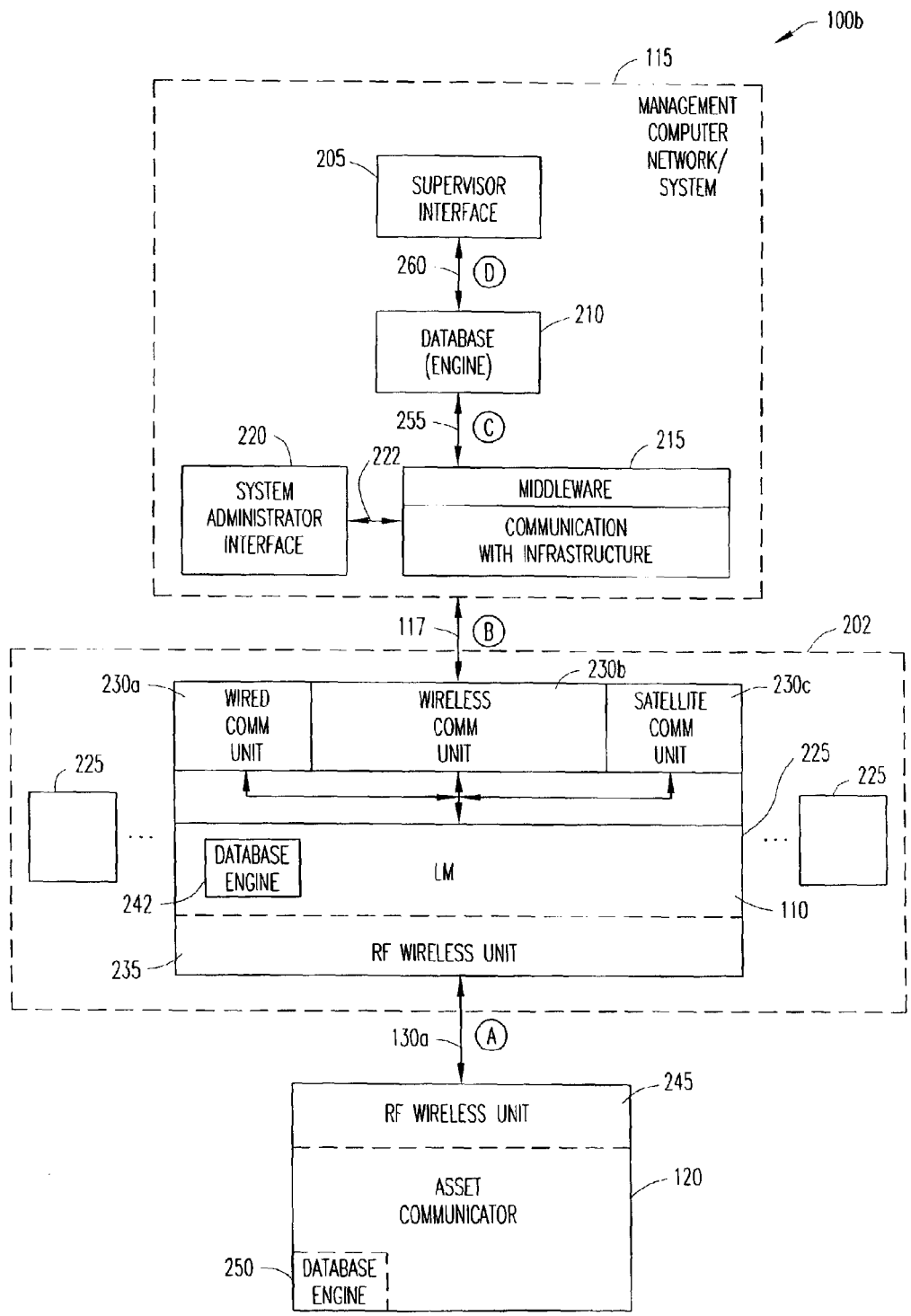
FIG. 2 is a more detailed block diagram of the robust wireless communications system of FIG. 1.

FIG. 2 is a more detailed block diagram of the robust wireless communications system of FIG. 1. The robust wireless communications system 100c includes the management computer network 115, wireless infrastructure 202, and asset communicator 120. The management computer network 115 includes a supervisor interface 205, database engine 210, middleware 215, and system administrator interface 220. The supervisor interface 205 is operable to provide a supervisor (e.g., a user or an external computing system operable to perform supervisory functions) of the management computer network 115 the capability to view data or update data (i.e., create new data, edit existing data, and/or delete existing data) stored in a database. For example, a supervisory user (i.e., supervisor) may use the supervisor interface 205 to view an asset location report stored in the database, and a supervisory computing device may automatically update a list of employees stored in the database. The database engine 210 may be any software operable to manage data stored in the database. For example, the database engine 210 may be a commercial (e.g., Oracle) or non-commercial database engine. The middleware 215 is software and/or hardware operable to provide communication between the database engine 210 and wireless infrastructure 202. The middleware 215 may also provide other management or functional operations as understood in the art. The system administrator interface 220 provides a system administrator the ability to perform a variety of functions in direct communication with the middleware via a communication link 222. One function that may be performed by the system administrator interface 220 includes altering the communication range of one or more local monitors 110.

The wireless infrastructure 202 includes at least one wireless infrastructure unit 225. The wireless infrastructure unit 225 includes a local monitor 110, at least one of which is coupled to a wired communication unit 230a, a wireless communication unit 230b (e.g. cellular or wireless LAN), and/or a satellite communication unit 230c (collectively 230) that communicates with the middleware 215 via the local communication link 117. The local monitor 110 includes a processor for operating a database engine 242, which may be the same or similar to the database engine 210 of the management computer network 115, and other software (not shown) that performs specific business functions. The wireless infrastructure unit 225 further includes a radio frequency (RF) wireless unit 235. The RF wireless unit 235 may include hardware and software for performing wireless communications utilizing any wireless protocol as understood in the art. For example, a wireless Ethernet standard may be utilized by the wireless infrastructure unit 225 to communicate with the asset communicators 120 via the asset communication link 130a. A local monitor 110a may communicate with another local monitor 110b via the respective RF wireless units 235. Although the local monitor 110 is shown to be coupled to the communication units 230 and RF wireless unit 235, an alternative embodiment of the local monitor 110 may include either or both units 230 and 235 in the same physical box.

The asset communicator 120 includes an RF wireless unit 245 for communicating with the RF wireless unit 235 of the wireless infrastructure unit 225. Additionally, the asset communicator may include a wired unit (not shown) for direct wire communication with a portable computing system, for example, for downloading to or uploading from the asset communicator 120.

The asset communicator 120 further includes a database engine 250 operable to manage data being collected or received by the asset communicator 120. The asset communicator 120 also contains a computer program on-board to determine what, when, where, and how often to communicate as previously discussed.

Both the asset communicators 120 and the wireless infrastructure units 225 may be considered embedded systems, where an embedded system is defined as a combination of hardware and software that together form a component of a larger system. An example of an embedded system is a microprocessor that controls an automobile engine. Embedded systems are designed to execute without human intervention, and may be required to respond to events in real-time.

The asset communicator 120 is coupled to the wireless infrastructure 202 via the asset communication link 130a (link A). The wireless infrastructure 202 is coupled to the management computer network 115 via the local communications link 117 (link B). The middleware 215 is coupled to the database engine 210 via a communication link 255 (link C). The database engine 210 is coupled to the supervisor interface 205 via a communication link 260 (link D)

Traditionally, mobile wireless devices, such as asset communicators, are capable of performing their intended operation by having communication links A, B, and C simultaneously operating. The principles of the present invention, however, allow for the asset communicators 120 to operate autonomously without having links A, B, and/or C simultaneously operating. As previously discussed, the asset communicator 120 and wireless infrastructure unit 225 are intelligent in that they are capable of performing decisions that traditionally only the management computer network 115 performed.

Figure 3:
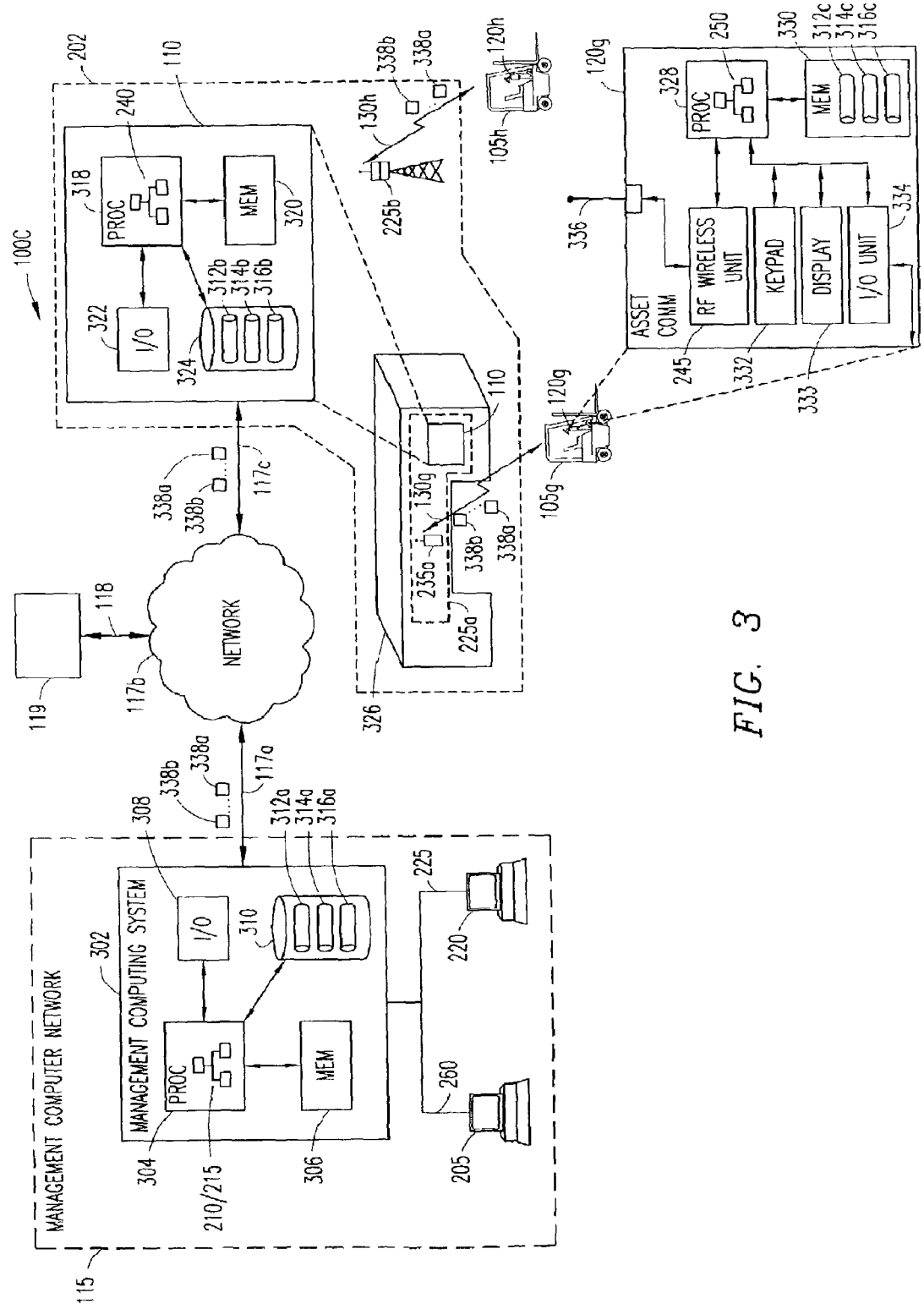
FIG. 3 is another exemplary block diagram of the robust wireless communications system of FIGS. 1 and 2.

FIG. 3 is another exemplary block diagram of the robust wireless communications system of FIGS. 1 and 2. The management computer network 115 includes a management computing system 302 having a processor 304 coupled to a memory 306, I/O device 308 and storage device 310. The storage device 310 may include one or more databases 312a, 314a, and 316a, for example. The databases 312a-316a may be used to store various data associated with performing asset management. The databases may operate as relational databases in that each database may have corresponding or associated data elements with one or more other databases. For example, multiple databases may have a vehicle number so that any data associated with the vehicle number in either database may be related utilizing the database engine 210.

The management computing system 302 may further be coupled to the supervisor interface 205 via the communication link 260 (link D), and the system administrator interface 220 via the communication link 222. The supervisor interface 205 and system administrator interface 220 may be utilized to interact with the management computing system to modify and view the data stored in the databases 312a-316a. The supervisor 205 and system administrator 220 interfaces may utilize the same processor 304 as the management computing system 302.

The processor 304 may execute the database engine 210 and middleware 215. Alternatively, the database engine 210 may be executed on a different processor in conjunction with the storage device 310. In that regard, the storage device 310 may be external from the management computing system 302 and be formed of one or more storage devices. The storage devices 310 may be a magnetic and/or optical disk, or be of another memory device type, such as random access memory.

The management computing system 302 may further be coupled by the local communication link 117, which includes communication link 117a, network 117b (e.g., the Internet), and communication link 117c. The webserver 119 may be coupled to the network 117b via the network communication link 118. The wireless infrastructure 202a may be coupled to the network 117b via communication link 117c, and include a local monitor 110 that includes a processor 318 coupled to a memory 320, I/O unit 322, and storage device 324. The storage device may be internal or external from the local monitor 110, and be utilized to store databases 312b, 314b, and 316b. The databases 312b-316b may be replicated from the databases 312a-316a. The processor 318 may execute the local monitor database engine 242 that operates to maintain the replicated databases 312b-316b. As indicated by the dashed lines, the local monitor may be maintained in a facility 326 that the operator of the facility utilizes to perform asset management for mobile and/or fixed assets.

The local monitor 110 may be coupled to the RF wireless unit 235 via a wired or wireless communication link (not shown), thereby forming a wireless infrastructure unit 225a. A second wireless infrastructure unit 225b formed of a local monitor 110 and RF wireless unit is also utilized to communicate with assets 105 on the premises. The wireless infrastructure units 225a and 225b communicate with asset communicators 120g and 120h associated with mobile assets 105g and 105h (e.g., forklifts)

The asset communicator 120g includes the RF wireless unit 245 coupled to a processor 328. The processor 328 may further be coupled to a memory device 330, keypad 332, display 333, and input/output (I/O) unit 334. The memory 330 may be random access memory, flash memory, or programmable read-only memory as understood in the art. Alternatively, the memory 330 may be a magnetic or optical disk. The memory 330 may be operable to store databases 312c, 314c, and 316c.

The I/O unit 334 may include receiving and/or transmitting devices, and be coupled to power, sensors, or other input and output devices (not shown). The I/O unit 334 of the asset communicator 120 may receive power from a power source, such as a battery, located on the asset 105 or from a battery coupled to the asset communicator 120. The decision as to whether to receive power from an internal (e.g., battery of asset communicator 120) and/or external power source (e.g., battery of asset 105, wall power, etc.) may be based on the application that the asset communicator is being utilized. For example, if the asset communicator 120 is being used for tracking a forklift, it may be appropriate to draw power from the forklift. If, however, the asset communicator 120 is being used for tracking a parcel, then a battery of the asset communicator 120 is used to provide power as, in general, a parcel does not have a battery. It should be understood that a battery may be included with the asset communicator 120 and be utilized as a backup power supply as understood in the art upon the asset communicator 120 losing power from the asset 105. The sensors may include temperature, current, voltage, impact, motion, pressure, weight, or any other such electronic sensors. Input devices may include barcode scanners, proximity card readers, magnetic card readers, and other biometric reading devices. The output devices may include relays, switches, lights, sirens, horns, or any other electronic output device. The RF wireless unit 245 may further be coupled to an antenna 336.

The size, structure, and configuration of the asset communicator 120 may be dependent upon the environment and asset 105 that the asset communicator 120 is associated. For example, if the asset communicator 120 is utilized in an industrial or outdoor environment, then a heavy duty housing being substantially water resistant may be used. If, however, the asset communicator 120 is utilized to perform parcel tracking, then the size, weight, thickness, and flexibility, for example, is an issue. In such a case, the asset communicator 120 may be constructed of multiple circuit boards. In one embodiment, three circuit boards having minimal dimensions (e.g., one-by-two inches) may be coplanar and coupled via a flexible, flat cable and/or circuitry having transmission lines for communicating data between the circuit boards. By using the flexible, flat cable, the asset communicator 120 is capable of being bent without breaking during shipping of the parcel. Additionally, the circuitry on the circuit boards may be coated with a durable, compressible material, such as rubber, to prevent damage to the circuitry and to reduce stresses on the circuit boards during shipping of the parcel. A battery may further be coupled to the asset communicator 120 via the cable to provide power to the circuit board and allow for replacement. It should be understood that while the size, structure, and configuration of the asset communicator may vary, the functionality of the asset communicator 120 remains substantially the same.

In operation, the management computing system 302 may operate as a central computing system for the robust wireless communications system 100c. An operator of the supervisor interface 205 may view or update (i.e., create, edit, or delete) information or data stored in the database(s) 312a-316a utilizing the database engine 210. For each addition, edit, or deletion, a transaction code (see FIG. 4) is associated with the data, thereby forming a data record or dataset, which is stored in a database 312a, for example. The management computing system 302, utilizing the database engine 210 and middleware 215, communicates the data stored in the database 312a utilizing the I/O unit 308 in data packets 338a-338b over the network 117b to specified local monitors 110 based on business functions being performed and current communication links. For example, a text message may be transmitted to only the local monitor 110 in communication with the asset communicator 105g as determined by the middleware 215 in conjunction with the database engine 210. As another example, a broadcast text message may be transmitted to all local monitors 110 servicing asset communicators 120.

The local monitor 110, utilizing the database engine 240, stores the data in the database 312b, if necessary, to replicate the database 312a. By replicating the database 312a in the local monitor 110, it is possible for the local communication link 117 to fail and the local monitor 110 to operate independently. The data stored in the local monitor 110 may thereafter be transmitted or broadcast the data temporally to the asset communicators 120g and 120h operating in the range of the RF wireless units 235a and/or 235b. While the local monitor 110 is storing the data for further communication, the local monitor 110 may determine that the data becomes obsolete before communicating the data to asset communicator(s) 120. Such a situation may occur upon (i) the data becoming expired or out-of-date (e.g., notification for scheduled maintenance becoming past due), (ii) the data being superseded by newer data (e.g., work instructions being modified by the supervisor), or the data becoming irrelevant (e.g., text message having utility for a duration of five minutes), for example. If the data becomes obsolete, the local monitor 110 may simply not communicate and/or delete the data being stored therein.

An asset communicator 120g that receives the data via data packets 338a-338b may determine that the data is associated with the particular asset communicator 120 by identification of a data field, and store the data in a database 312c. The database 312c is a subset of the data stored in the databases 312a and 312b. In other words, the data stored by the management computing system 302 is communicated to the local monitor 110, stored therein for an indefinite period of time, and transmitted from the local monitor 110 to all asset communicators 120 in range thereof, if needed. The asset communicators 120 are intelligent and capable of parsing the received data to determine the data associated therewith. Therefore, the databases 312c-316c are subsets of the databases 312a-316a and 312b-316b. It should be understood that each asset communicator 120 may receive and store data in similarly configured databases.

Figure 4:
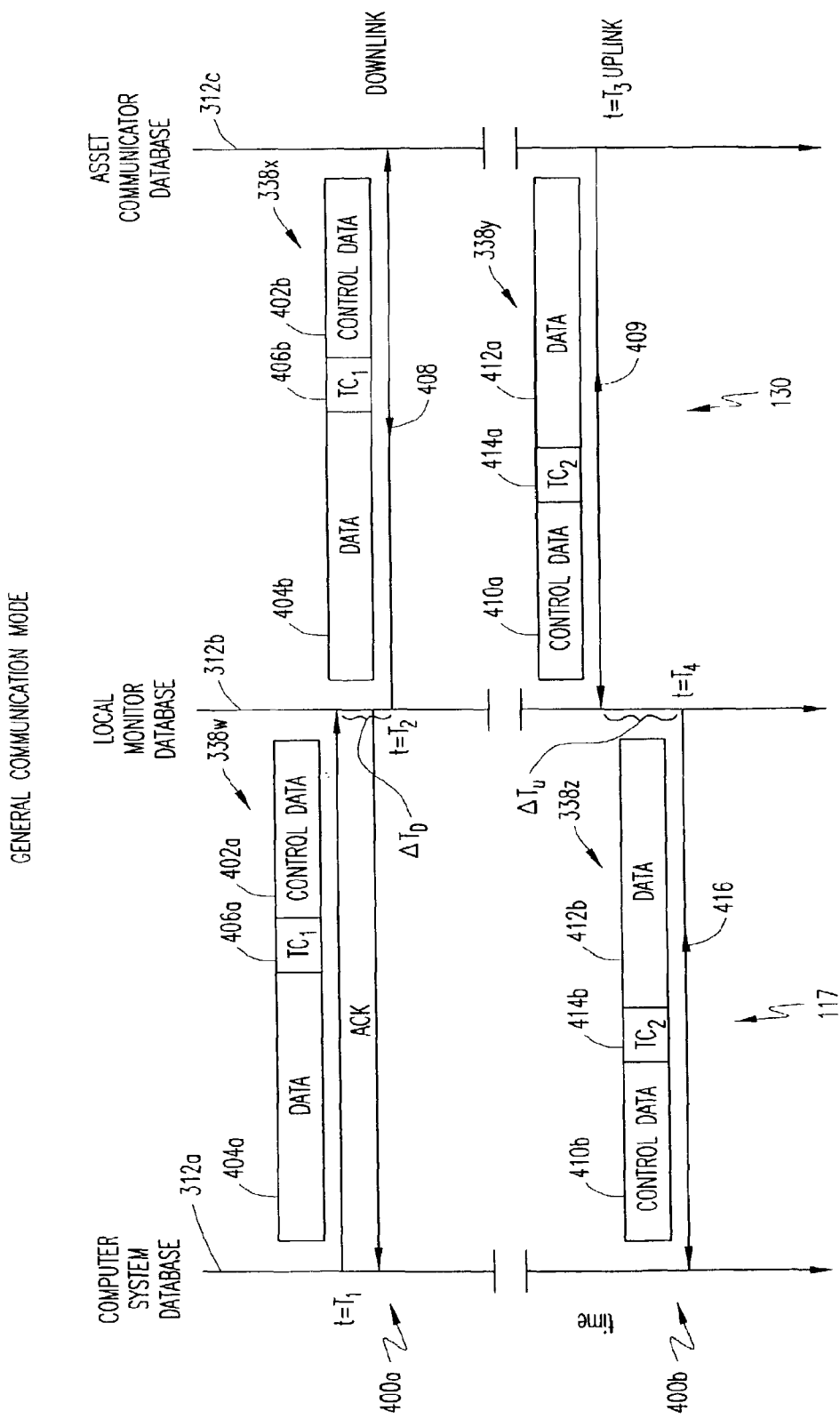
FIG. 4 is an exemplary interaction diagram for performing downlink and uplink communications between components of the robust wireless communications system of FIG. 3.

FIG. 4 is an exemplary interaction diagram 400 for performing downlink and uplink communications between components of the robust wireless communications system of FIG. 3. The three associated databases 312a, 312b, and 312c are indicated by the vertical lines. Additionally, time increases down the vertical lines. Data communicated between the computer system database 312a and local monitor database 312b in the downlink direction is transmitted over the local communication link 117. The data is communicated in a data packet 338, which may include control data 402a and data 404a and datasets stored in the databases 312a-316a, for example. The data 404a includes a transaction code ($TC_1$) 406a. As understood in the art, the control data 402a is associated with data communicated via data packets 338 as part of a data communication protocol. Acknowledgement packets 407 may be used to ensure that the downlink data is successfully replicated as determined by the local monitors 110 utilizing a checksum or other data verification technique as understood in the art. The acknowledgement 407 may occur upon completion of all data being transmitted from the computer system database 312a to the local monitor database 312b to minimize network bandwidth requirements.

Upon the data being successfully received by the local monitor database 312b, the data is stored for an unspecified period of time $\Delta T_D$. At some random or non-random time $T_2$ the data may be read and transmitted from the local monitor 110 via data packet 338x to an area or cell 111 that the local monitor 110 services. As indicated, the control data 402b, data 404b, and transaction code 406b may be different than the control data 402a, data 404a, and transaction code 406a due to (i) the time delay between $T_1$ and $T_2$ and (ii) new data received by the computer system database 312a not having been transmitted to the local monitor database 312b. An acknowledgement packet 408 may be used to confirm the receipt of the data packet 338x depending upon whether confirmation is desired for a particular business function. For example, if a text message is transmitted to a particular asset communicator 120g, then the acknowledgement 408 is desirable. Alternatively, if a broadcast text message is transmitted to all asset communicators 120, then an acknowledgement is not necessary. Ultimately, however, the data from the computer system database 312a is transmitted and may be stored in the asset communicator database 312c. While the data communicated across the communication links 117 and 130 may be transmitted sequentially (i.e., first across the local communication link 117 and second across the asset communication link 132), the data need not be communicated simultaneously across the communication links 117 and 130. Upon the data being received by the asset communicator database 312c, an acknowledgment 408 may be communicated back to the local monitor database 312b, and the data 404b may be deleted therein. By deleting the data 404b within the local monitor database 312b, repetitive transmission of the data 404b may be eliminated.

With regard to uplinking, upon the asset communicator 120 collecting and storing the data in the asset communicator database, the asset communicator 120 may perform the uplink communication 400b from the asset communicator database 312c to the local monitor database 312b. At $T_3$, a data packet 338y, including control data 410a and data 412a associated with a transaction code ($TC_2$) 414a, is transmitted from the asset communicator database 312c to the local monitor database 312b. If there is sufficient storage capacity, the data 412a is stored by the local monitor database 312b for an indefinite period of time $\Delta T_u$ and an acknowledgement 409 is sent to the asset communicator. This time period $\Delta T_u$ may extend for a minimal duration or any duration of time until the local communication link 117 becomes operational or active. Once the acknowledgement 409 is received, the asset communicator 110 may delete the data packet 338y from its memory. If there is not sufficient storage capacity in the local monitor 312b, the asset communicator 110 continues to store or transmit the data 338y to another local monitor database 312b. At time $T_4$ the data 412b, including transaction code 414b, is transmitted from the local monitor database 312b to the computer system database 312a via data packet 338z. An acknowledgment 416 may be communicated back to the local monitor database 312b from the computer system 312a so that (i) the local monitor database 312b does not continue to communicate the data 412b to the computer system database 312a, and (ii) the data may be deleted from the local monitor database 312b. The control data 402a, 402b, 410a, and 410b may include authentication and/or encryption data to ensure validity and security of communications to protect confidential information. It should be understood that in both the downlink 400a and uplink 400b communications that additional acknowledgment from the local monitor database 312b may be communicated back to both the computer system database 312a and the asset communicator database 312c to notify each to stop communicating the information associated with the particular transaction codes transmitted.

The communication technique of FIG. 4 is realizable because of the intelligence built into both the local monitor 110 and asset communicator 120. And, because of the communication technique, the robust communications system 100c is capable of handling and solving many business problems involved in managing assets remotely.

Figure 5:
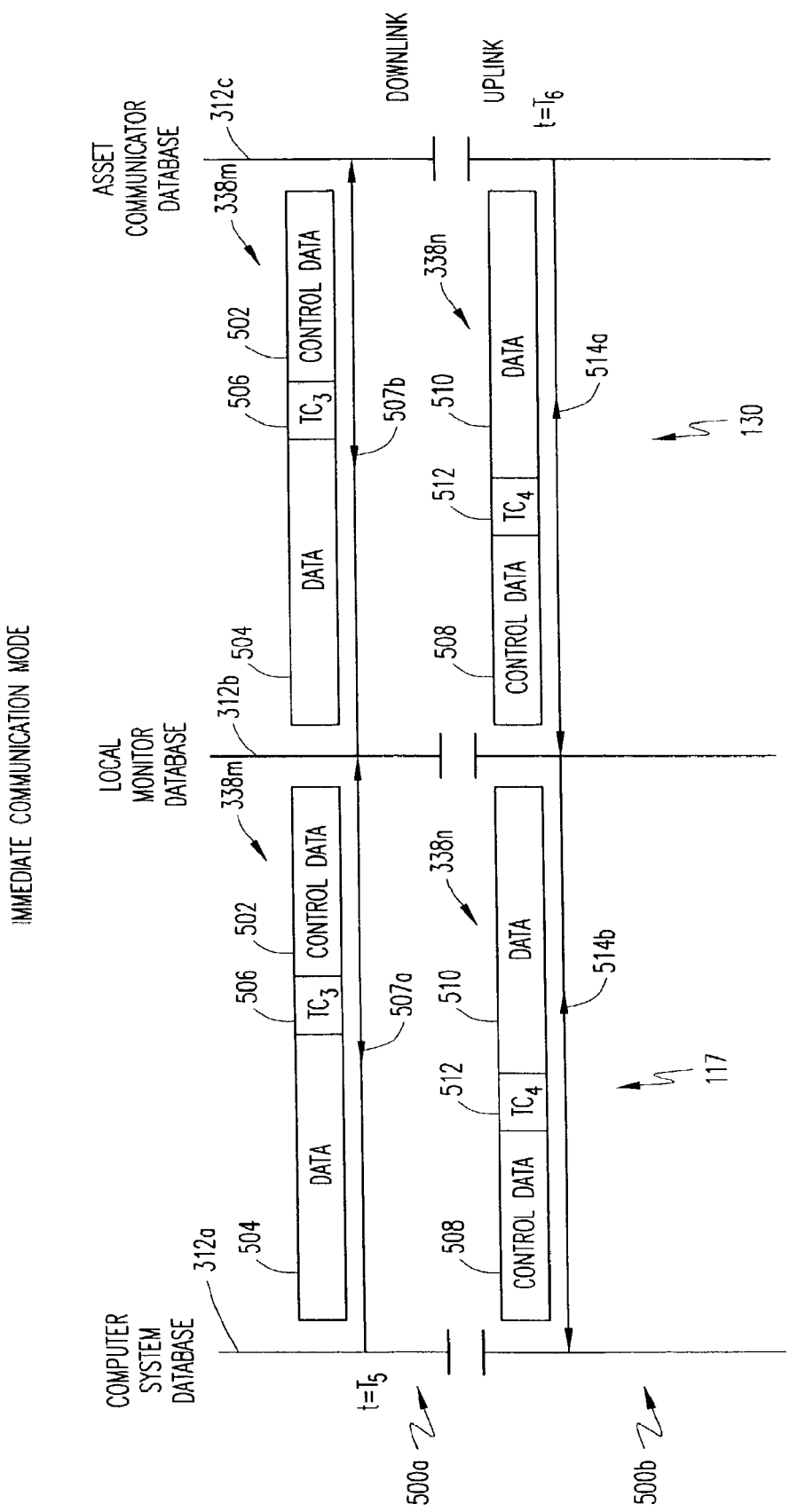
FIG. 5 is an exemplary interaction diagram for performing immediate communications between the components of FIG. 3.

FIG. 5 is an exemplary interaction diagram 500 for performing immediate communications between the components of FIG. 3. A downlink communication 500a and uplink communication 500b are shown for the paging communications that may be utilized on the robust wireless communications system 100c. For the downlink communication, at time $T_5$, a data packet 338m may be communicated between the computer system database 312a and local monitor database 312b, and include control data 502 and data 504 associated with transaction code ($TC_3$) 506. Upon the local monitor database 312b receiving the data packet 338m, an acknowledgement signal 507a may be communicated back to the computer system database 312a for verification purposes. The local monitor database 312b may operate as a pass-through to the asset communicator database 312c in the immediate communication mode. Alternatively, the local monitor 110 may not store the data in the local monitor database 312b. In other words, there is little or no delay for the data being communicated from the computer system database 312a to the asset communicator database 312c. Accordingly, the data communicated from the local monitor database 312b to the asset communicator database 312c is the same or substantially similar data packet 338m including the control data 502, data 504, and transaction code ($TC_3$) 506. An acknowledgement signal 507b may be communicated from the asset communicator 120 back to the local monitor 110 upon receipt of the data packet 338m by the asset communicator database 312c.

Similarly, the uplink communication 500b in the immediate communication mode transmits data at time $T_6$ from the asset communicator database 312c to the computer system database 312a with a minimal amount of delay via the local monitor database 312b. The data may be communicated in a data packet 338n, which includes control data 508 and data 510 associated with a transaction code ($TC_4$) 512. The data packet 338n is thereafter communicated from the local monitor database 312b to the computer system database 312a with minimal or no alterations or delay. Acknowledgement signals 514a and 514b may be communicated from the local monitor 110 to the asset communicator 120 and from the management computing system 302 to the local monitor 110, respectively, upon receipt of the data packets 338n. As understood in the art, the immediate communication mode may operate similar to conventional wireless data communication techniques as understood in the art utilizing any communication standard thereof.

Data Synchronization

Figure 6A:
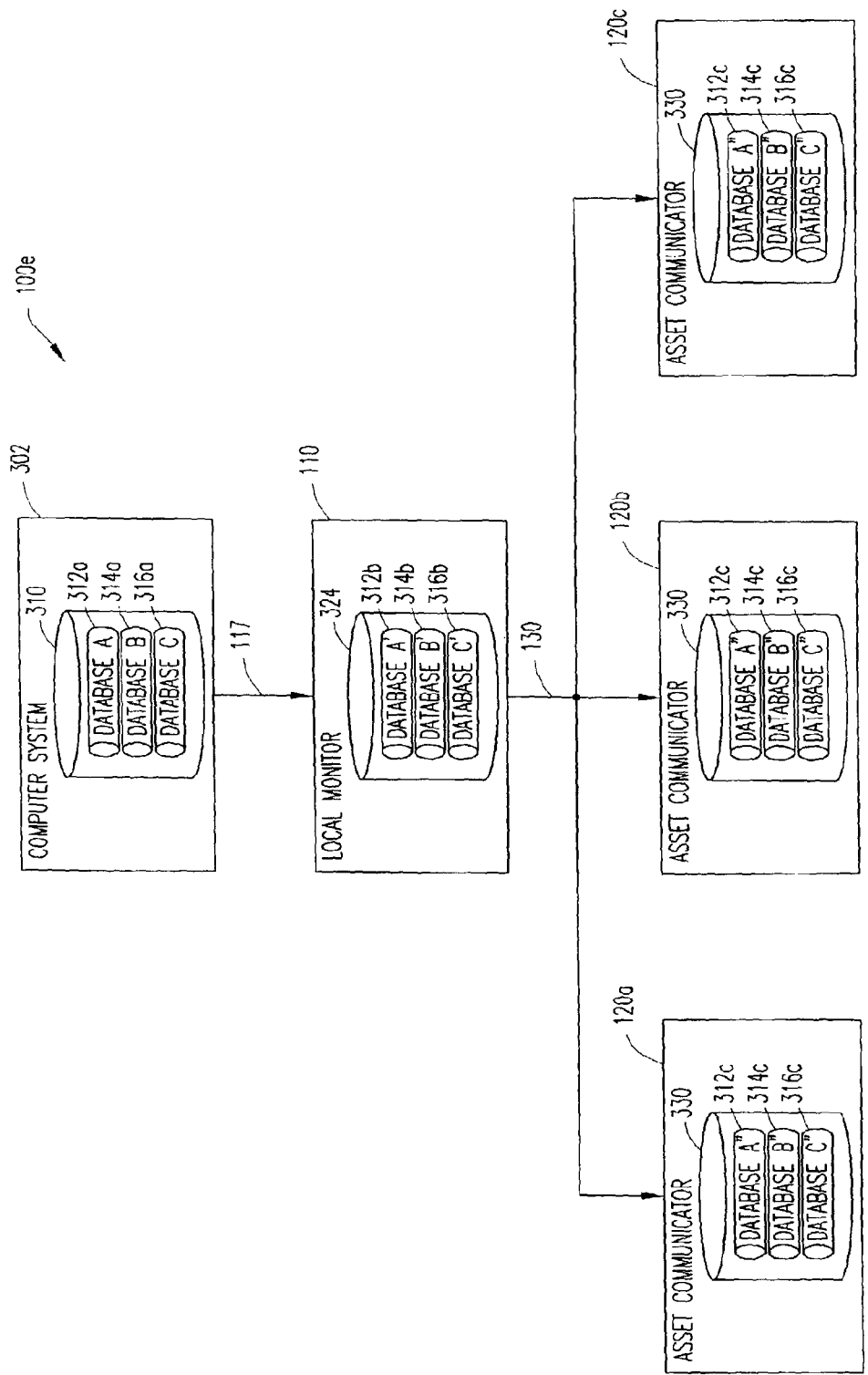
FIGS. 6A and 6B are exemplary databases operating in the robust wireless communications system of FIG. 3.
Figure 6B:
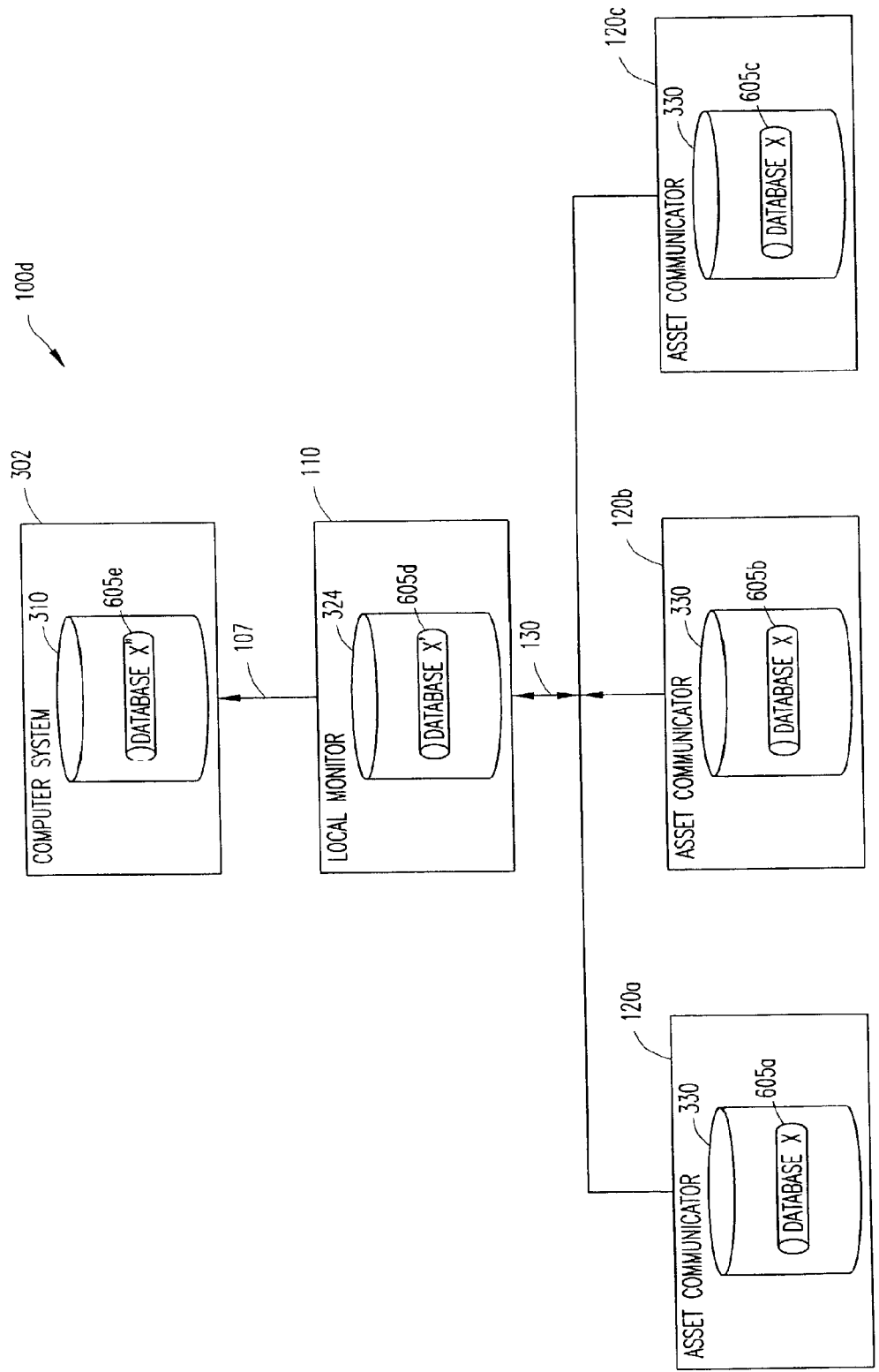

FIGS. 6A and 6B are exemplary databases operating in the robust wireless communications system of FIG. 3. FIG. 6A illustrates the downlink functionality of the robust communications system 100d. As shown, the management computing system 302 includes the storage device 310 and databases 312a, 314a, and 316a (databases A, B, and C). To indicate the database that a dataset is associated, a transaction type specifier may be included with each dataset. The transaction type specifier (e.g., "collision", "low battery", "location", and "text message response") may be utilized to differentiate different dataset types communicated to the asset communicator 120. The transaction code associated with each dataset may be included to indicate the most up-to-date data from the associated database. The data stored in the databases 312a-316a may be transmitted to the local monitor 110 while the local communication link 117 is established. The local monitor 110 stores the data on the storage device 324 in databases (A'-C') 312b-316b. While databases 312b-316b are intended to be replicas of the databases 312a-316a, it may not be possible to have exact replicas at any given point in time due to the local communication link 117 or other hardware or software failures during operation and/or synchronization of the data between the management computing system 302 and local monitor 110. Additionally, depending on the application and type of data, a complete replication of the databases 312a and 312b may not be needed.

Generally, the local monitor 110 communicates the data stored in the databases 312b-316b in a broadcast fashion (i.e., without regard to asset communicators 120 in the broadcast area of the local monitor 110). Alternatively, the local monitor 110 may broadcast to only those asset communicators 120 that have registered with the local monitor 110 upon being within broadcast range. However, by broadcasting a data without regard to asset communicators 120 in the broadcast area, the bandwidth of the broadcast may be increased due to the acknowledgement 408 not needing to be transmitted and received, and the broadcast process may be simplified. It should be understood that the data communicated via the asset communication link 130 is made from each of the databases 312b-316b, and may be performed in a temporal order based on transaction codes associated with the datasets stored in the databases 312b-316b.

Each asset communicator 120a-120c receives the data broadcast from the local monitor 110. Each asset communicator 120a-120c parses the data received and stores only the data associated therewith as determined by the contents of the data (e.g., mobile asset identifiers and transaction codes). Once the asset communicator 120 has received a dataset having a particular transaction code, the asset communicator 120 does not store a dataset having a transaction code indicating that the dataset is not up-to-date. As shown, the databases 312c-316c are indicated as being databases A", B", and C" to indicate that the data stored in the databases is a subset of the databases (A'-C') 312b-316b. It should be understood that although the data is indicated as being stored in three databases, other embodiments may use one or other numbers of databases for performing particular functions on the robust wireless communications system 100d. It should further be understood that the asset communicators 120 may receive all communicated data from the databases A', B', and C' and store all of the data in databases A", B", and C". However, such a communication technique may be problematic in terms of storage capacity in the asset communicators 120 depending on the volume of data located in the databases A', B', and C'.

FIG. 6B is the uplink representation for the robust wireless communications system 100d. As indicated, each asset communicator 120 forms a database (X) 605a, 605b, and 605c. The databases 605a-605c may be utilized for storing location or utilization information particular to each of the asset communicators 120a-120c. A transaction type specifier, transaction code, and asset number, may be included in each dataset. The transaction code may be utilized along with the asset number to form a unique dataset key. The transaction type specifier, again, is utilized to identify the database that the dataset is associated. When the asset communicators 120a-

120c are individually in range of the local monitor 110, the asset communicators 120a-120c may transmit the data stored in the databases 605a-605c to the local monitor 110 via the asset communication link 130. The data is stored in the database (X') 605d. The local monitor 110 communicates an acknowledgment to the asset communicator 120a indicating that the data was received by the local monitor 110. The asset communicator 120a thereafter does not continue transmitting that particular dataset associated with the particular transaction code. The data may remain stored on the asset communicator 120a, but is eventually overwritten with new data or used for future calculations.

The local monitor 110 may thereafter transmit the data stored in the database 605d to the management computing system 302. The data may be stored in the database (X") 605e via the local communication link 117. Although the data is intended to be replicated between databases (X) 605d and 605e, due to the local communication link 117 and the hardware/software operation of the local monitor 110 and the management computing system 302, the databases may not be synchronized at all points in time as the database 605d continues to receive data from the asset communicators 120.

In the event that the local communication link 117 becomes disabled, the local monitor 110 maintains the data stored in the database 605d without transmitting to the management computing system 302. As the database 605d fills up and eventually becomes full, a message is communicated to the asset communicators 120a-120c in the broadcast area of the local monitor 110 indicating that the local monitor 110 may no longer receive data from the asset communicators 120a-120c due to a temporary memory full condition. If any of the asset communicators 120a-120c are within range of another local monitor 110, then the data may be transmitted to the other local monitor 110. Because the asset communicators 120a-120c are intelligent, the asset communicators may be configured to transmit the data to the local monitor 110 over incremental periods of time (e.g., 30 seconds, 1 minute, 5 minutes, 30 minutes, etc). And, if the asset communicators 120 are unable to transmit the data to a local monitor 110 due to communication problems or simply being out of range, the asset communicators 120 are capable of storing the data for many months due to the ability of the asset communicators 120 to summarize and consolidate, or purge the data being collected based on business rules. In addition, intelligent wireless communication techniques, such as re-transmissions, frequency hopping, communication back-off (i.e., reducing communication rate based on communication failure), and communication termination also may be used to improve communication link and system-wide communication. Upon an asset communication link 130 being reestablished with the local monitor 110 by the asset communicators 120, all the backlogged data may thereafter be transmitted to the local monitor 110.

Figure 7:
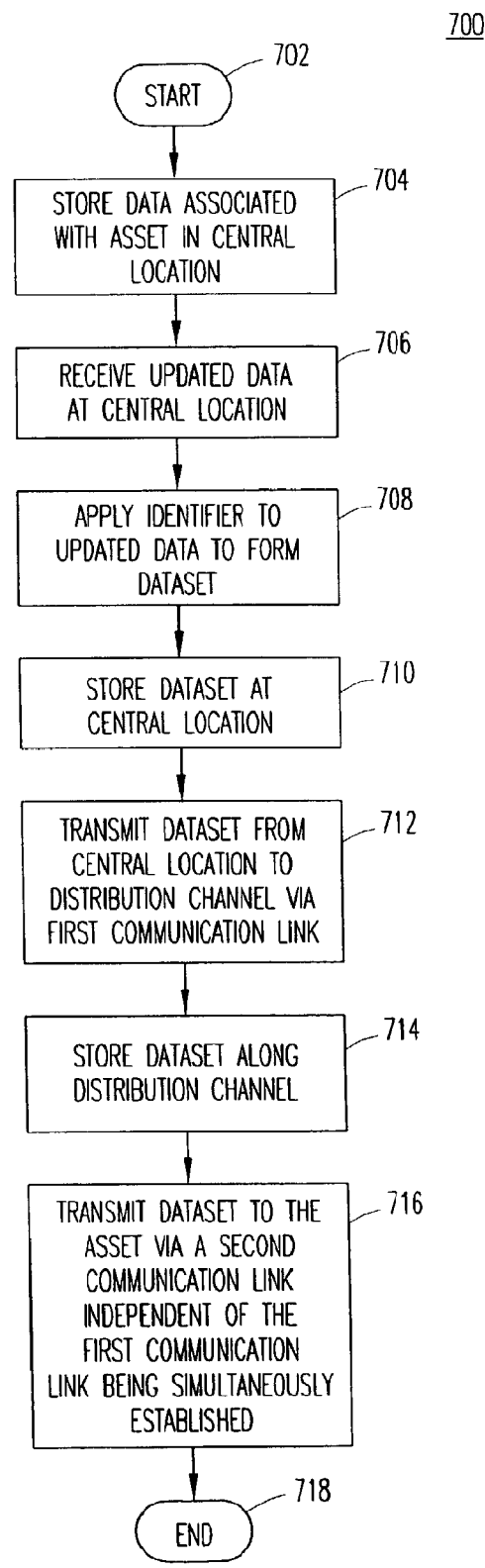
FIG. 7 is an exemplary flow diagram for communicating data in the robust wireless communications system of FIG. 3.

FIG. 7 is an exemplary flow diagram for communicating data in the robust wireless communications system of FIG. 3. The process starts at step 702. At step 704, data associated with an asset is stored in a central location. Updated data may be received at the central location at step 706. At step 708, an identifier is applied to the updated data to form a dataset. At step 710, the dataset may be stored at the central location. The central location may transmit the dataset to a distribution channel via a first communication link at step 712. At step 714, the dataset is stored along the distribution channel. At step 716, the dataset is transmitted to the asset via a second communication channel independent of the first communication link being simultaneously established. The process ends at step 718.

Figure 8:
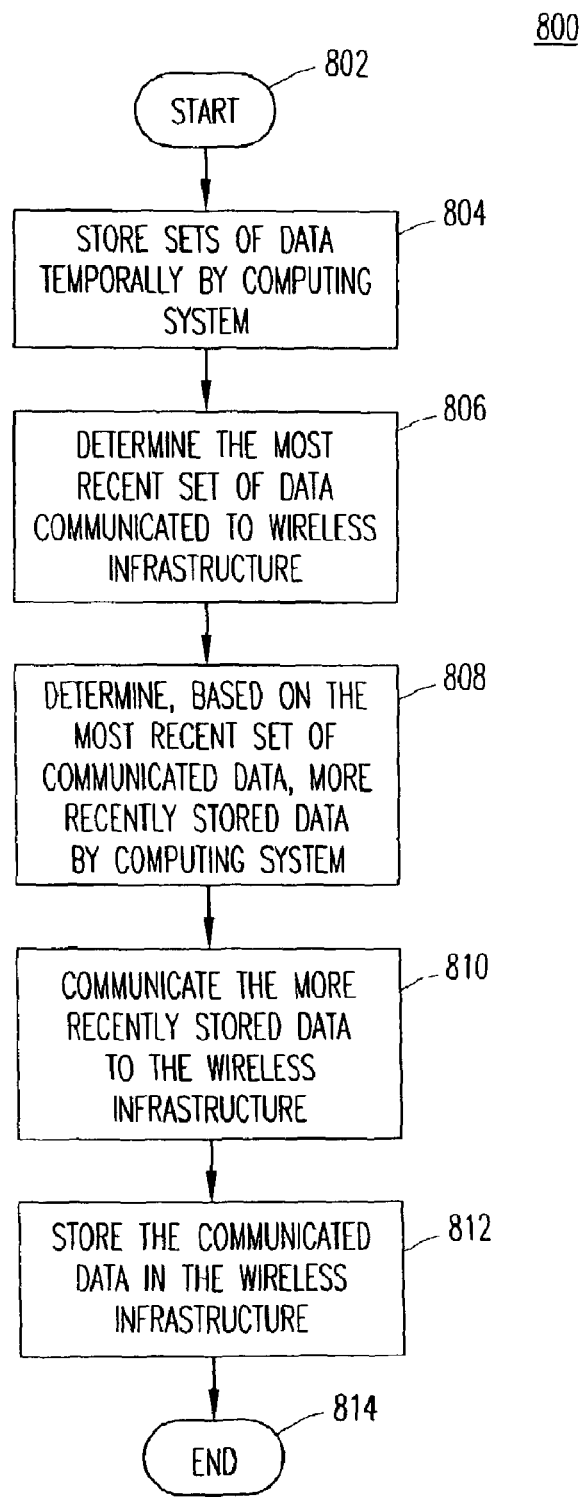
FIG. 8 is another exemplary flow diagram for communicating data in the robust wireless communications system of FIG. 3.

FIG. 8 is another exemplary flow diagram 800 for communicating data in the robust wireless communications system of FIG. 3. The process starts at step 802. At step 804, sets of data are stored temporally by a computing system. At step 806, the most recent set of data communicated to a wireless infrastructure is determined. One method to determine the most recent set of data communicated (and stored) is to transmit a query to the wireless infrastructure 202. Based on the most recent set of communicated data, more recently stored data by the computing system is determined at step 808. At step 810, the more recently stored data is communicated to the wireless infrastructure 202. At step 812, the communicated data is stored in the wireless infrastructure 202. The process ends at step 814.

Figure 9A:
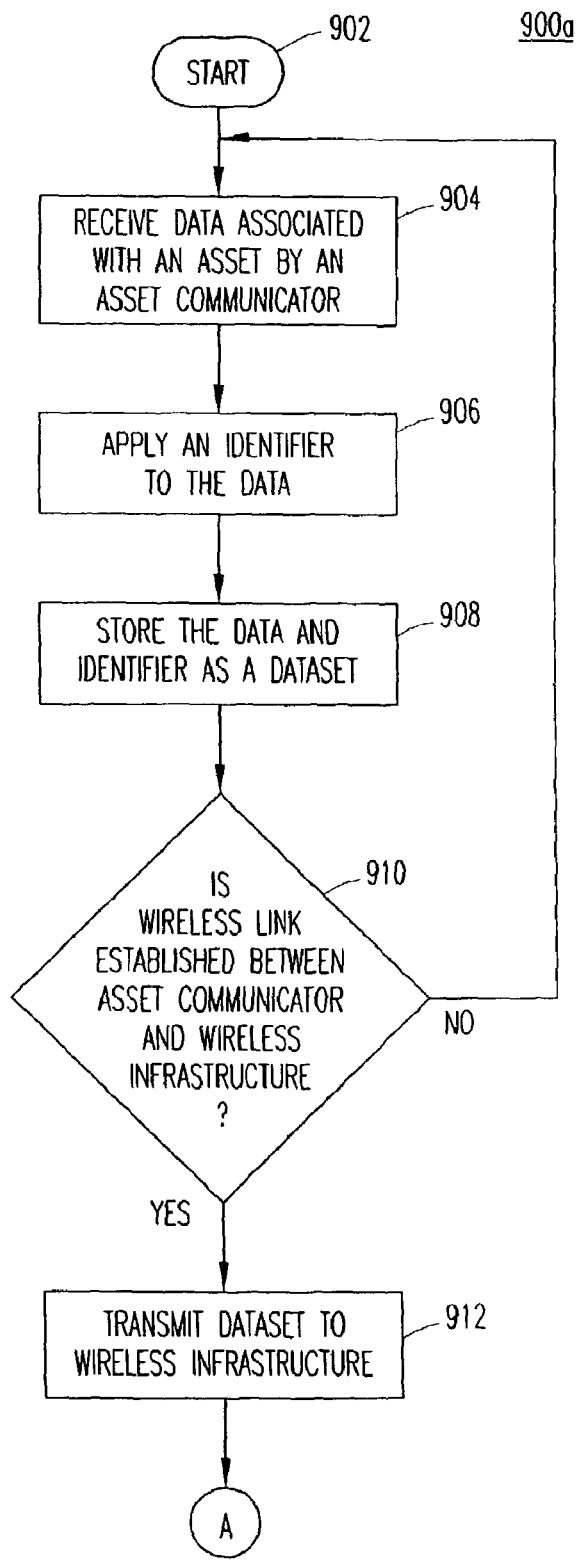
FIGS. 9A and 9B are exemplary flow diagrams for performing uplink communication on the robust wireless communications system of FIGS. 3, 4, and 6B.
Figure 9B:
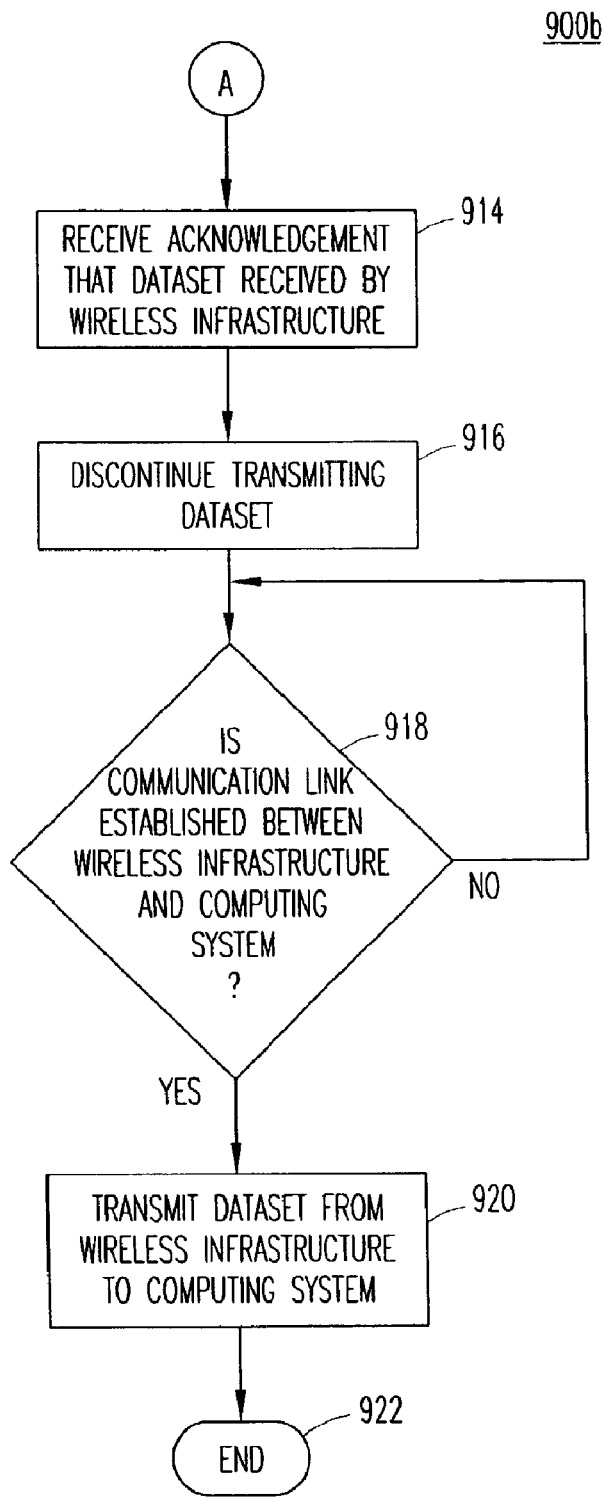

FIGS. 9A and 9B (collectively FIG. 9) illustrate exemplary flow diagrams 900a and 900b for performing uplink communication on the robust wireless communications system of FIGS. 3 and 6B. The process starts at step 902. At step 904, data associated with an asset 105 is received by an asset communicator 120. The data may be measured by sensors located on the asset 105 or may be data entered by an operator of the asset communicator 120. The data may also include location data or data created through the receipt of wireless data. At step 906, an identifier, such as a transaction code, is applied to the data. The identifier may be temporal in relation to identifiers associated or applied to other data received by the asset communicator 120. The identifier may be a transaction code having an indicator associated with the asset communicator 120. At step 908, the data and identifier are stored as a dataset.

At step 910, a determination is made as to whether a wireless link is established between the asset communicator 120 and wireless infrastructure 202. If an asset communication link 130 is currently established between the asset communicator 120 and the wireless infrastructure 202, then the dataset is transmitted to the wireless infrastructure 202 at step 912. Otherwise, the process returns to step 904, and the asset communicator 120 continues to receive and collect data associated with the asset 105 by the asset communicator 120. At step 914, the asset communicator receives an acknowledgment that the dataset was received by the wireless infrastructure 202, and the asset communicator discontinues transmitting the dataset at step 916.

At step 918, a determination is made as to whether a local communication link is established between the wireless infrastructure 202 and a management computing system 302. If a local communication link 117 is established, and, if the dataset must be transmitted to the management computing system, then the dataset is transmitted from the wireless infrastructure unit 225 to the management computing system 302 at step 920. Otherwise, the data is stored or maintained by the wireless infrastructure 202 until the local communication link 117 is re-established. The process ends at step 922.

Asset Management Applications Utilizing Robust Wireless Communications System Architecture The following applications to provide various asset management functions utilize the robust wireless communications system as discussed hereinabove. Depending upon the particular application and business problem being solved, the communication techniques of FIGS. 4 and 5 are utilized to communicate data within the system.

Relational Database Configuration

Figure 10:
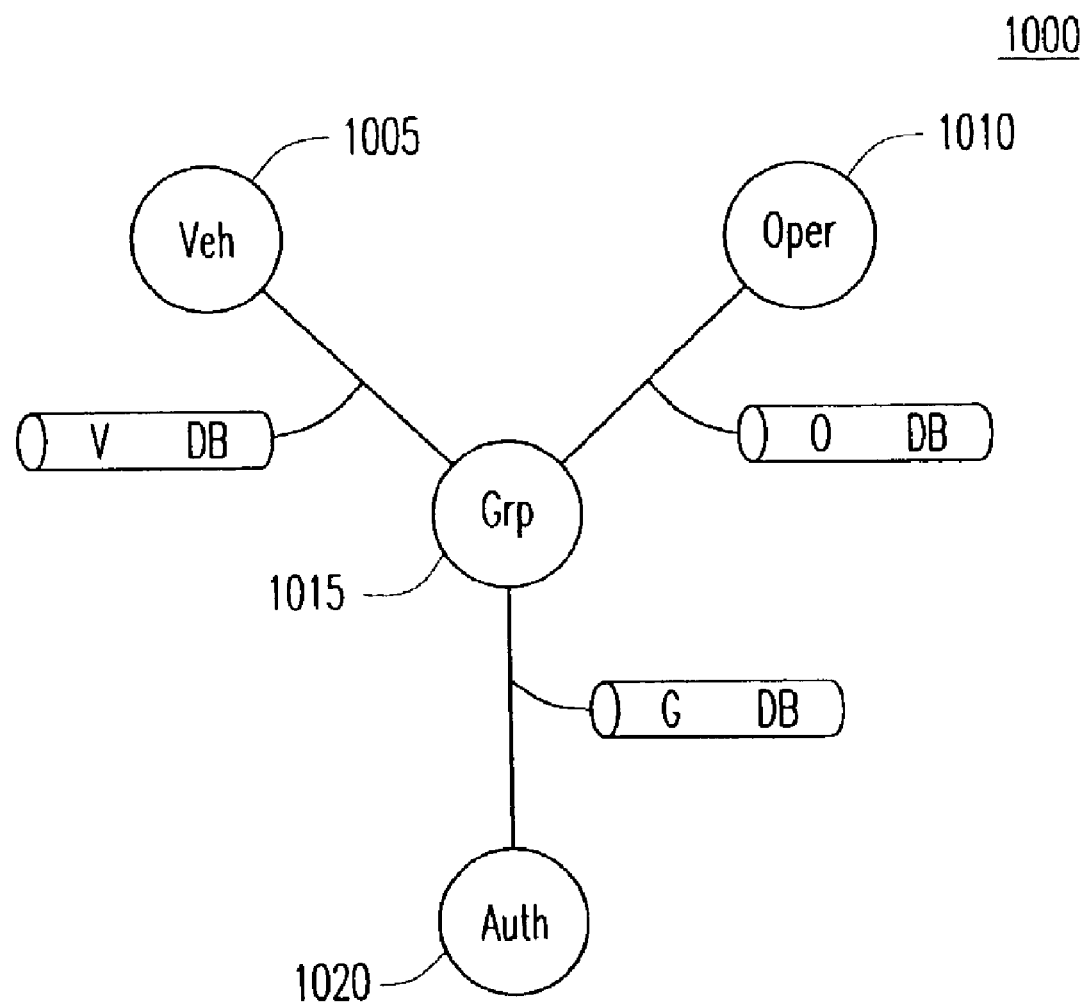
FIG. 10 is a graphical representation of entities associated with the robust wireless communications system of FIG. 3 and relational databases associated therewith.

FIG. 10 is a graphical representation 1000 of entities associated with a robust wireless communications system based on that of 100c of FIG. 3, and relational databases associated therewith. The information associated with the entities are utilized to provide access control and authorization for operators to utilize the assets 105. Four entities, including vehicles 1005, operators 1010, groups 1015, and authorizations 1020 are linked together by relational databases (V, O, G). A vehicle (V) database links the vehicle 1005 and group 1015 entities. An operator (O) database links the operator 1010 and group 1015 entities. And, a group (G) database links the authorization 1020 and group 1015 entities. Each of these databases (i.e., V, O, and G) may be generated and maintained in the management computer network 1005 by a supervisor utilizing the supervisor interface 205. As understood in the art, each of the databases includes information associated with the particular entities of which the databases are associated.

TABLES 1, 2, and 3 hereinafter provide exemplary information stored in the vehicle, operator, and group databases, respectively. As shown in TABLE 1, each dataset includes a transaction code, group identification (ID), and vehicle number. For each dataset, the transaction code is incremented based on the number of updates to the vehicle database. The group identifier associated with a particular vehicle is indicative of a particular group of operators or employees who have access rights to operate the vehicle. For example, a group may be defined as a shipping department or group identified with a head of a department. For example, vehicle number "372A7C" may be operated by any member associated with the group "A4", which may represent the shipping department. As indicated by the asterisk behind each vehicle number, the vehicle number information is not stored in the asset communicator databases 312c, for example, as the vehicles need not utilize such information.

TABLE 1

Vehicle Information

| Transaction Code | Group ID | Vehicle Number |
|---|---|---|
| 0173842 | A4 | 372A7C* |
| 0173843 | A4 | 382B2G* |
| 0173844 | A5 | 382B2G* |

*Not stored in asset communicator database

TABLE 2 includes datasets having operator (employee) number, password/PIN, and group ID data elements. As indicated, the group ID's match the group ID's provided in the vehicle database of TABLE 1. For example, group "A5" is associated with operator number "00050" has a password of "871734". As indicated in TABLE 1, operator "00050" may have access to vehicle "382B2G". Each dataset stored in the operator database also includes a transaction code. As shown, the transaction codes for the operator database are independent of the transaction codes for the vehicle database (TABLE 1).

TABLE 2

Operator Information

| Transaction Code | Operator (Employee) Number | Password/PIN | Group ID |
|---|---|---|---|
| 0024187 | 03421 | 781242 | A4 |
| 0024188 | 00050 | 871734 | A5 |
| 0024189 | 00279 | 473892 | A4 |

TABLE 3 is the group database that provides authorization based on various parameters for the groups to utilize the vehicles associated therewith. The group database includes group ID (to provide relation to TABLES 1 and 2), days, times, and locations. Again, a transaction code is associated with each dataset for synchronization purposes within the different databases (e.g., databases 312a, 312b, and 312c). As shown, members of group "A4" are authorized to operate vehicles between Monday and Friday during the hours of 8:00 a.m. to 5:00 p.m., (i.e., 0800-1700) in locations "L8" and "L17". It should be understood that while multiple databases may be utilized to form relations between the data (e.g., group information database provides a relationship between the operator and vehicle information databases), that less-relational databases (e.g., each operator and vehicle pair may be stored in one database) may be utilized to perform the same or similar functionality. However, the use of relational databases allows the system to (i) limit the amount of data communicated across the communication links 117 and 130, and (ii) simplify the process of associating vehicles and operators. For example, if a new vehicle is added to a fleet of vehicles, then the supervisor may simply add the vehicle to a group rather than having to assign individual operators to the vehicle directly.

TABLE 3

Group Information

| Transaction Code | Group ID | Authorization | | |
| | | Days | Times | Locations |
|---|---|---|---|---|
| 0047184 | A4 | Mon-Fri | 0800-1700 | L8, L17 |
| 0047185 | A5 | Mon-Sat | 1500-2300 | L9, L17, L20 |
| 0047186 | A6 | Sun-Thu | 2300-0700 | L3, L8, L19 |

The information on stored in the databases may be generated, edited, and/or deleted by an operator of the supervisor interface 205, and may be maintained by the database engine 210. For each creation, edit, and deletion, a transaction code may be assigned thereto. Alternatively, a time-stamp may be assigned to the information. However, by utilizing a transaction code, memory requirements may be reduced. The databases may be maintained separately or integrated into a single database as understood in the art. The datasets stored in the databases are thereafter downloaded from the management computer network 115 to the wireless infrastructure unit 225 and, ultimately, the asset communicators 120 as discussed with regard FIGS. 3 and 6A.

The asset communicators 120 in the cell 111 of the local monitor 110 of the wireless infrastructure unit 225 receive each dataset that is transmitted from the wireless infrastructure unit 225. However, the asset communicators 120 parse the datasets received from the wireless infrastructure 120 based on vehicle number, as understood in the art. For example, from the vehicle database (TABLE 1), vehicle number "372A7C" receives the information associated with transaction code "0173842" having a group identifier of "A4". Any data record thereafter received being associated with group identifier "A4" is received and stored and/or updated by the vehicle "372A7C". For example, from the operator database (TABLE 2), transactions "0024187" and "0024189", and information associated therewith are stored by the asset communicator 120. Additionally, from the group database (TABLE 3), the dataset having transaction code "0047184" is stored and/or updated in the asset communicator 120.

Once the asset communicators are updated by the datasets received, operators of the assets 105 may only access the asset communicators 120 and utilize the vehicles associated therewith by having their operator number and password accepted by the asset communicator 120. In other words, a potential operator unauthorized to access the asset 105 is unable to start the asset 105 if not authorized by a supervisor of the asset 105 by downloading access data to the asset 105 to provide access rights for the potential operator.

Because the asset communicator 120 is intelligent and unrequired to have access to the management computer network 115, an asset 105 that does not have a communication link to the wireless infrastructure unit 225 and management computer network 115 still is operable by an operator. Therefore, the utilization of the assets 105 is unaffected by communication outages and out-of-range situations for the assets 105 to be operated. Thus, a robust wireless communication and asset management system is provided.

Also, since the intelligent asset communicator 120 may have a user interface, including a keypad 332 and display 333, an authorized operator can directly modify the authorization database stored on the asset communicator using the keypad and display. For example, an authorized operator may permit another operator to use the asset 105 by typing the identification number of the other operator directly into the asset communicator 120.

In addition to the access control allowing an operator to turn on the asset, the access control also allows for turning off the asset based on location and time. Because the asset communicator 120 is intelligent, the asset communicator does not shut down the asset while in use and in motion, for example. Rather, the asset communicator 120 determines when a "significant" stop has occurred (e.g., the vehicle has stopped for a predetermined period of time), and the asset 105 is disabled by the asset communicator 120.

In addition to the asset communicator 120 being capable of taking action based on access control, the asset communicator 120 and/or wireless infrastructure device 225 may provide access to unauthorized operators based on business rules. For example, if the asset 105 becomes out-of-range for an extended period of time, the asset communicator 120 may provide access to a select number or any operator as the asset communicator 120 may consider that a communication problem exists (e.g., receiver failure). In the case of the wireless infrastructure device 225 not receiving communications from the management computing system 302 over an extended period, the wireless infrastructure device 225 may discontinue broadcasting data as it may be assumed that some or all of the data stored by the wireless infrastructure device 225 is invalid.

Figure 11:
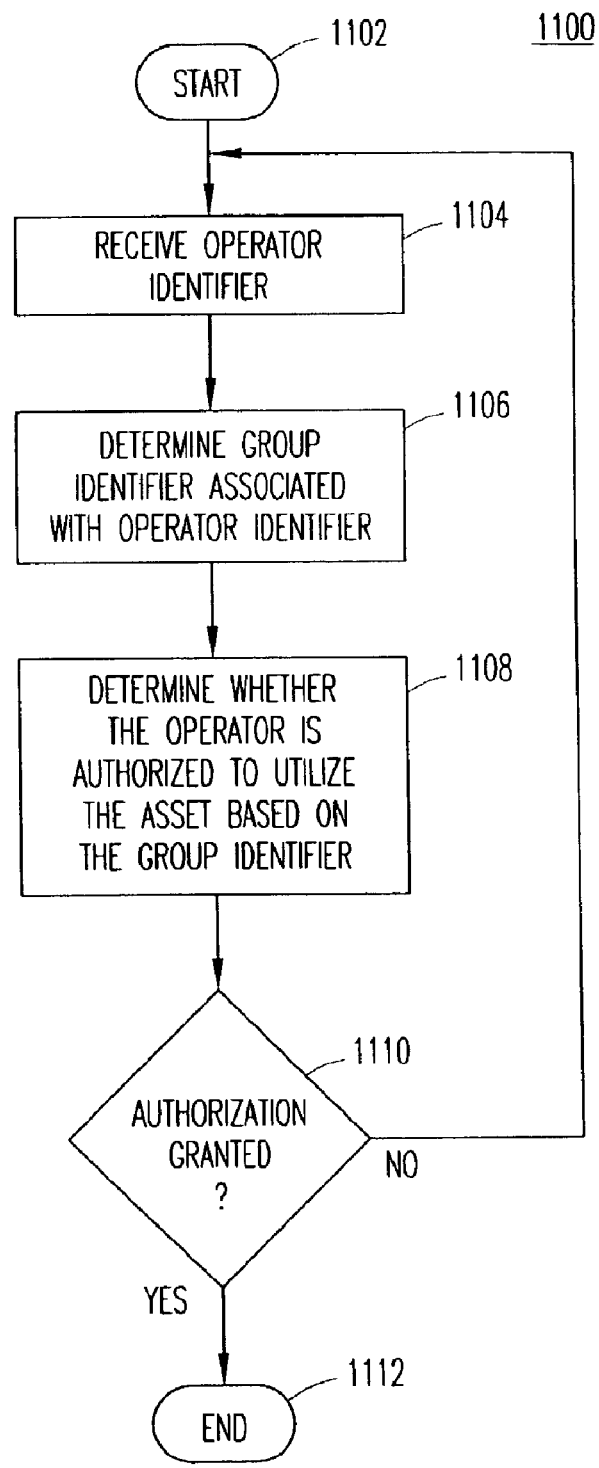
FIG. 11 is an exemplary flow diagram for determining and providing authorization of an asset for an operator utilizing the robust wireless communications system of FIGS. 3, 4, and 6A.

To summarize the access control process, FIG. 11 is an exemplary flow diagram for determining and providing authorization of an asset for an operator utilizing the robust wireless communications system of FIGS. 3 and 6A. The process starts at step 1102. At step 1104, an operator identifier is received via at least one of a variety of input devices, including, but not limited to, a keypad 332, card reader, memory chip reader, barcode scanner, wireless receiver, and biometric scanner. It should be understood that a password may also be received depending upon the business and/or security requirements. At step 1106, a group identifier associated with the operator identifier is determined utilizing the database(s) stored in the asset communicator 120. A determination is made at step 1108 as to whether the operator is authorized to utilize the asset based on the group identifier. At step 1110, a determination is made as to whether authorization to the asset 105 is granted based on the group, time of day, day of week, and/or location, for example. If authorization is granted, then the process ends at step 1112. Otherwise, the process returns to step 1104 to receive a new operator identifier.

Distributed Wireless System Behavior Control

The robust wireless communications system 100c may have system behavior altered in a distributed manner. The system parameters may be utilized to control a wide variety of functions of the wireless infrastructure unit 225 and asset communicators 120. In general, a generic wireless communications system may be provided to a customer, and the customer may alter the system parameters to customize the system according to desires and needs.

Figure 12:
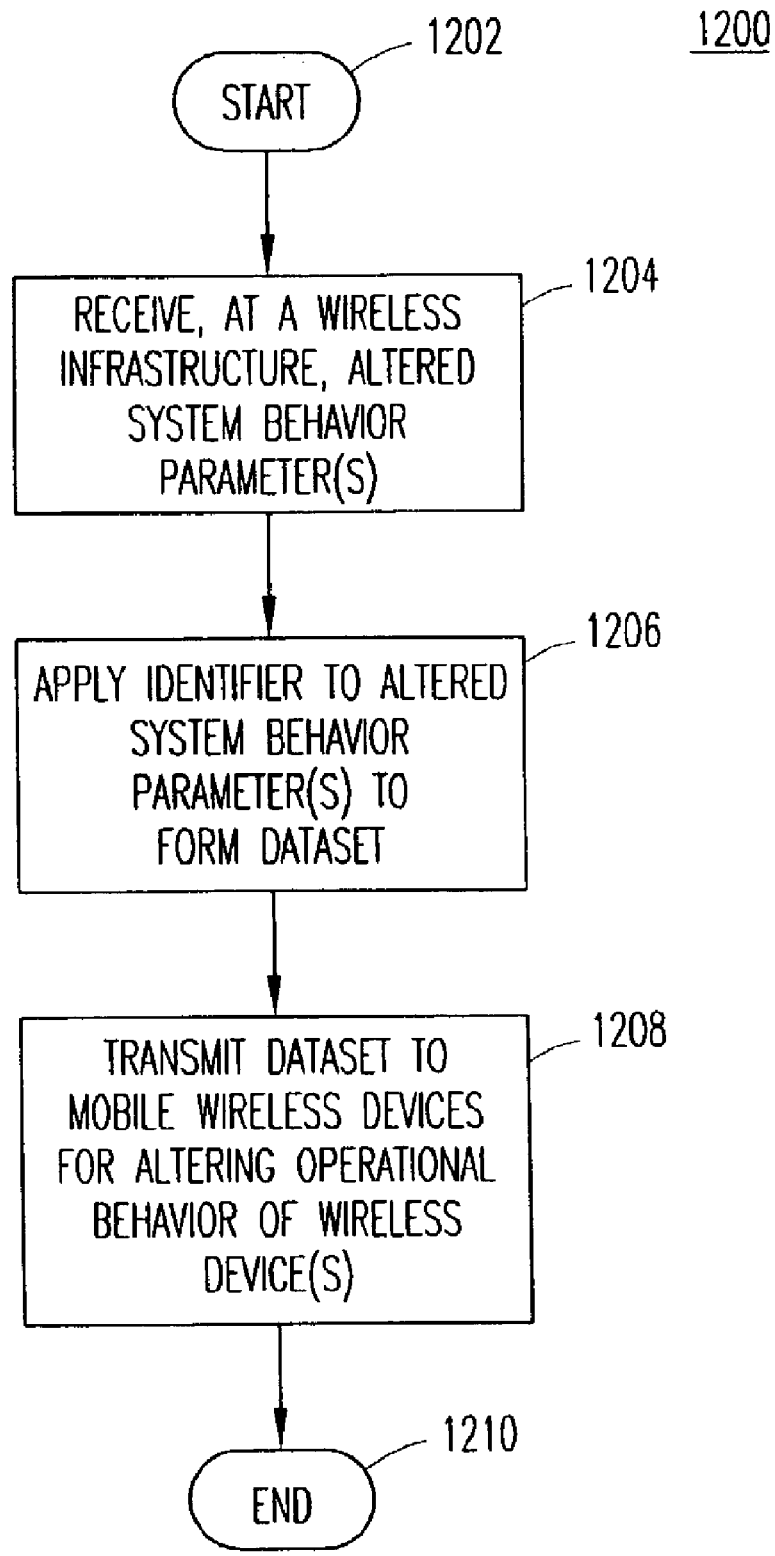
FIG. 12 is an exemplary flow diagram describing altering system parameters for the robust wireless communications system of FIG. 3.

FIG. 12 is an exemplary flow diagram 1200 describing altering of system parameters for the robust wireless communications system of FIG. 3. The process starts at step 1202. At step 1204, the wireless infrastructure unit 225 receives altered system behavior parameters. The system behavior parameters may include data transmission rates, access control rules, screen behavior, keypad behavior, power modes, and scheduling of communication, for example. The system parameters may be utilized in the wireless infrastructure unit 225 for communicating to the asset communicators 120 or may be downloaded to the asset communicators 120 utilizing the communication technique of FIG. 4 to alter operational behavior. The changes may affect different asset communicators differently, unless a universal command is desired.

At step 1206, an identifier is applied to the altered system behavior parameter(s) to form a dataset. As discussed with regard to the databases, the identifier may be a transaction code utilized to indicate a temporal relationship between edits made to other system behavior parameters. The dataset may be stored in a system behavior parameter database on the management computer network 115 and downloaded to the wireless infrastructure unit 225 as discussed hereinabove. At step 1208, the dataset is transmitted to the asset communicators 120 for altering operational behavior of the asset communicator(s) 120. It should be understood, however, that the system behavior parameters may be directed toward the wireless infrastructure unit 225 and not the asset communicators 120, and therefore are not communicated to the asset communicators 120. The process ends at step 1210.

To alter the system behavior parameters, the system administrator interface 220 may be utilized rather than the supervisor interface 205. By utilizing the system administrator interface 220, a system administrator, who does not perform supervisory duties over the assets 105 or operators, is able to make the changes to the system parameters for controlling functionality of the wireless infrastructure unit 225 and asset communicators 120.

A general concept that the robust wireless communications system 100c is capable of providing is the ability to perform actions based on business rules being violated. A supervisor may define business rules that, upon being violated by an asset, operator, supervisor, supervisory computer, for example, trigger one or more events by at least one component of the system. And, because each of the components (e.g., management computing system 302, wireless infrastructure device 225, and asset communicator 120) are capable of making decisions, one or more of the components, individually or in combination, are capable of triggering event(s). For example, if a forklift 105 enters an unauthorized area of a facility, the associated asset communicator 120 may (i) shut down the forklift 105, and (ii) communicate a message to the wireless infrastructure device 225, which, in turn, may command all or some forklifts 105 in the area to be shut down. Additionally, the message may be received by the management computing system 302 and a system-wide message may be communicated to some or all asset communicators 120. And, because the asset communicator 120 is capable of making decisions, actions may be taken independent of the communication link 130 being established. It should be understood that the business rules may be varied depending on the system requirements, business functions being solved, and creativity of the system operators.

Vehicle Utilization Monitoring

The robust wireless communications system 100b provides the ability to perform vehicle utilization monitoring in an event driven manner due to the asset communicators 120 being intelligent (i.e., having an on-board processor and associated software). Vehicle utilization relates to how the vehicle is utilized as attributed to an operator, for example. Other associated parameters, such as location, shift, etc., may be utilized. TABLE 4 provides an exemplary dataset of utilization parameters for the asset 105 that are measured using sensors in combination with the asset communicator 120 and associated software. It should be understood that the parameters are exemplary and that others may be utilized depending on the particular asset associated with the asset communicator 120. For example, a fixed asset utilizes different parameters than a mobile asset 105, and different mobile asset types may have different parameters.

TABLE 4

Vehicle Utilization Information

Figure 13:
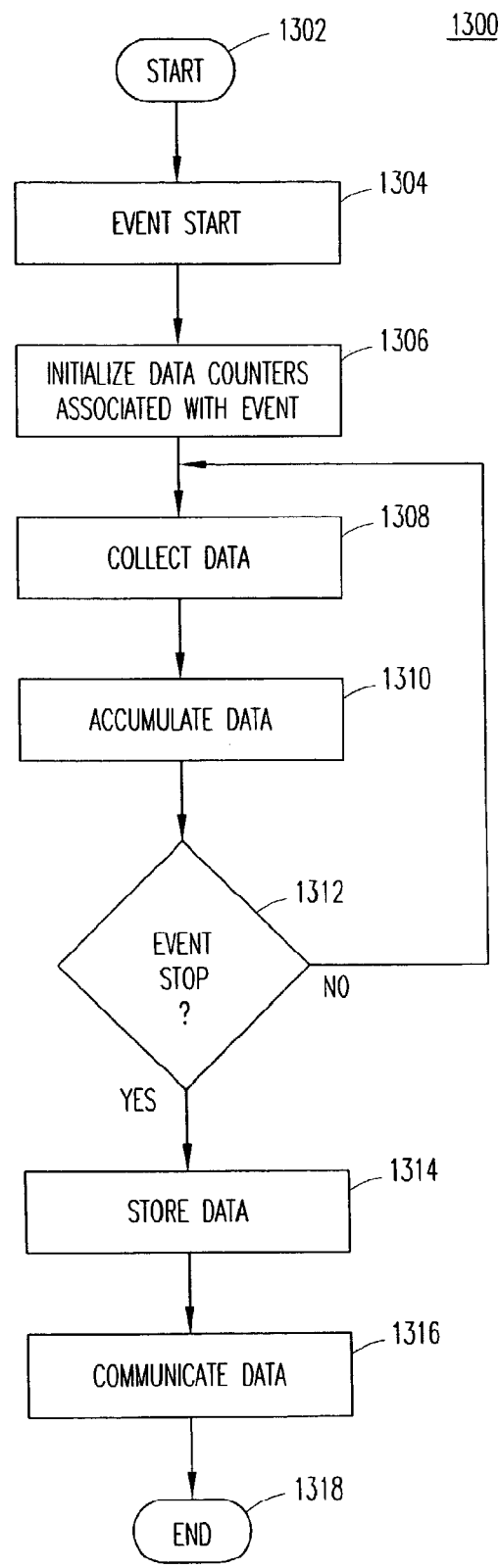
FIG. 13 is an exemplary flow diagram for the asset communicator to start and stop utilization monitoring as utilized on the robust wireless system of FIGS. 3 and 6B.

Segment Number
Transaction Code
Vehicle Number
Start Time
End Time
Operator ID
Log-out Method
Global Motion Time
Global Engine idle Time
Session Motion time
Session Lift Time
Session Engine idle Time
Session Number of Impacts
Current Fuel level
Current Odometer Reading
Battery ID
Session Number of Starts/Stops
Battery Level The vehicle utilization monitoring according to the principles of the present invention is event driven. One embodiment utilizes the events of an operator logging on and logging off of the asset communicator 120. FIG. 13 is an exemplary flow diagram 1300 for the asset communicator to start and stop utilization monitoring as utilized on the robust wireless system of FIGS. 3 and 6B (uplink). The process starts at step 1302. At step 1304, an event start is received an operator logging onto the asset communicator 120. At step 1306, data counters are initialized for the particular operator. The asset communicator 120 may (i) record lifetime or global counters, such as motion time and engine idle time, for the asset 105, and (ii) reset or initialize session counters, such as motion time, lift time, engine idle time, number of impacts, number of starts, and battery level.

At step 1308, data is collected by the asset communicator 120 for at least the global and session counters. At step 1310, the collected data is accumulated. In accumulating the data, both raw data and summary data based on the raw data may be generated. At step 1312, a determination may be made as to whether an event stop has occurred. The event stop may be initiated by the operator logging off of the asset communicator 120. Alternatively, an event start and stop may be generated by a predetermined time period, such as a 24-hour time period (i.e., at midnight), so as to generate utilization data for each and every time period. Additionally, in the case of the asset communicator 120 becoming idle, the event start is triggered from a logout and event stop is triggered from a logon. If an event stop has not occurred, then the process continues to collect data at step 1308. Otherwise, at step 1314, the collected data is stored for the global and/or session counters. As discussed in relation to FIG. 6B, a transaction type specifier and transaction code may be included in the dataset. It should be understood that other information may be collected and stored by the asset communicator 120 based on the same or different events. At step 1316, the stored data may be communicated from the asset communicator 120 to the wireless infrastructure 202 using the process of FIG. 9. The process ends at step 1318.

By summarizing the information based on events, the asset communicator 120 may operate independent of the wireless infrastructure 202 and management computer network 115. In other words, the asset communicator 120 need not have an active communication link with the wireless infrastructure 202 to perform its intended business function, thereby providing for a more robust asset management system. Additionally, by having the asset communicator 120 being able to perform its own monitoring (i.e., not merely transmitting the information to the wireless infrastructure in a "blind" manner), the amount of data communicated to the wireless infrastructure is greatly reduced. Moreover, because the asset communicator 120 summarizes the information collected during the session for the operator, the information becomes more useful in terms of monitoring and tracking the asset 105 as utilized by the particular operator. The summary data may also be stored in the asset communicator 120 as discussed with regard to the operation of the robust wireless communications system 100b until the asset communicator 120 forms an active asset communication link 130 with the wireless infrastructure 202. It should be understood that because the asset communicator 120 is capable of performing its own monitoring that the process of creating data is independent of the process of transmitting data, which, again, allows the asset communicator 120 to operate independent of the wireless infrastructure 202 and management computer network 115. Also, data can be used to affect future decisions, like whether or not OSHA needs to be entered by next operator.

Asset Power Monitoring

Figure 14:
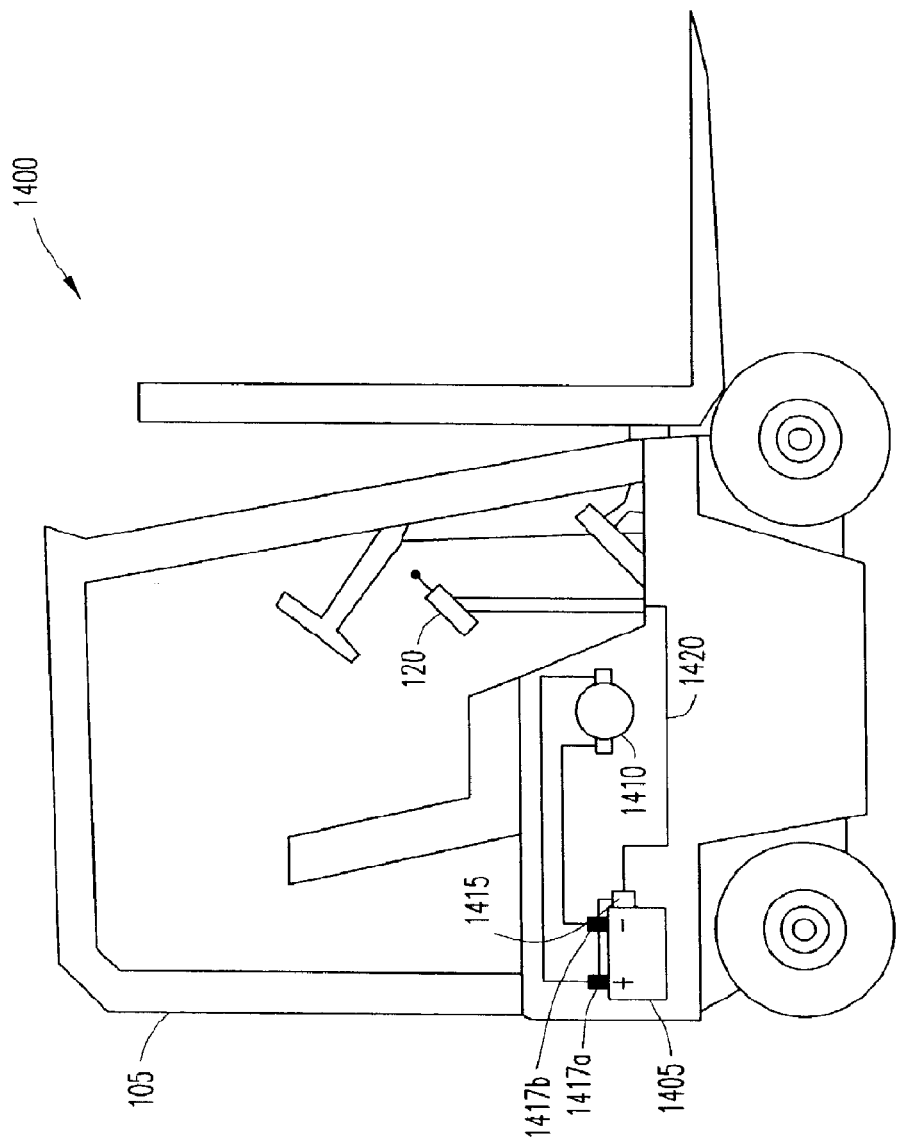
FIG. 14 is an exemplary illustration of a mobile asset having a power monitor for monitoring power usage according to FIG. 13.

FIG. 14 is an exemplary illustration 1400 of a mobile asset 105 having a power monitor for monitoring power usage according to FIG. 13. By wirelessly monitoring power usage over time, trend analysis and real-time monitoring of battery levels may be performed to provide a supervisor with visibility regarding battery operation and realization. As shown, the mobile asset 105 includes the asset communicator 120 coupled thereto. The mobile asset 105 further includes a battery 1405 coupled to a motor 1410 for driving the mobile asset 105. A power sensor 1415, which may be either voltage or current, is coupled to terminals 1417a and 1417b. One or more lines 1420 may couple the power sensor 1415 to the asset communicator 120 that, in turn, converts an analog voltage or current into a digital value indicative of the voltage level of the battery 1405. Alternatively, an analog to digital conversion unit (not shown) may be electrically coupled between the power sensor 1415 and asset communicator 120.

The asset power monitoring may further include in-line, tap-in, and contactless current and voltage sensors affixed to different parts of the mobile asset 105 and connected via a cable to a logic board (not shown), which may or may not be part of the asset communicator 120. Currents may be converted to voltages by utilizing either a remote sensor or a converter, as understood in the art, located on the logic board. The logic board converts the incoming voltage level to digital data. The asset communicator may use configurable settings, such as filter time and voltage conversion factors, to determine, based on the digital data, the meaning of the incoming signals. To set or change the configurable settings, manual, automatic, or event triggered processes may be utilized. Typically, filtering may be utilized to filter the data over a period of time, and compare the data to a threshold level. The sensor data may be combined or utilized individually by the logic board to monitor the utilization of the mobile asset 105. Upon the battery level dropping below the threshold level, an indicator, such as a visual or audible signal, may be provided by the asset communicator 120.

As in the case of vehicle utilization, the power information may be stored by the asset communicator 120 and communicated to the wireless infrastructure 202 using the communication technique of FIG. 9. Additionally, the power information may be event driven in that the data is determined based on an operator logging on and logging off of the asset communicator 120. A transaction type specifier and transaction code may be applied to the power information based on the events. It should be understood that the process for communicating power usage data of the mobile asset 105 may be the same or similar to that of the FIG. 13. Alternatively, communicating power usage data of the mobile asset 105 may be the same or similar to that of FIG. 16.

By monitoring the battery, a supervisor may determine how well a battery is operating based on historical data. The supervisor also may be able to determine misuse or disuse of the battery by an operator if the battery is being charged too soon or being charged too late. In other words, if a battery is being prematurely charged or being "deep" discharged, the battery may become damaged and the supervisor may be able to disrupt such practices by the offending operator(s). Because the asset communicator 120 is intelligent, the asset communicator 120 may be able to actively control improper practices. The battery usage may be monitored over time based on utilization of the assets 105 to determine whether the battery is operating properly based on usage.

Asset Monitoring Analysis

A desire of any asset or fleet supervisor is to have aggregate information about the assets and have all information about the fleet or groups/segments of the fleet without gaps in the information. Because the asset communicators 120 are capable of generating and storing information without having an active asset communication link 130 to the wireless infrastructure unit 225, utilization data of the assets are collected without having gaps in the information. And, because the asset communicators 120 store the information based on events until an active asset communication link 130 is established, information for the asset is not lost. In other words, the supervisor at some point in time has utilization information for all assets in the fleet at any given point in time. The supervisor interface 205 may execute a software program, such as the database engine 210, that accesses the databases 312a-316a, for example, and generates aggregate information. For example, a supervisor may desire to know the number of vehicles being utilized on each hour during the course of a particular day.

Figure 15:
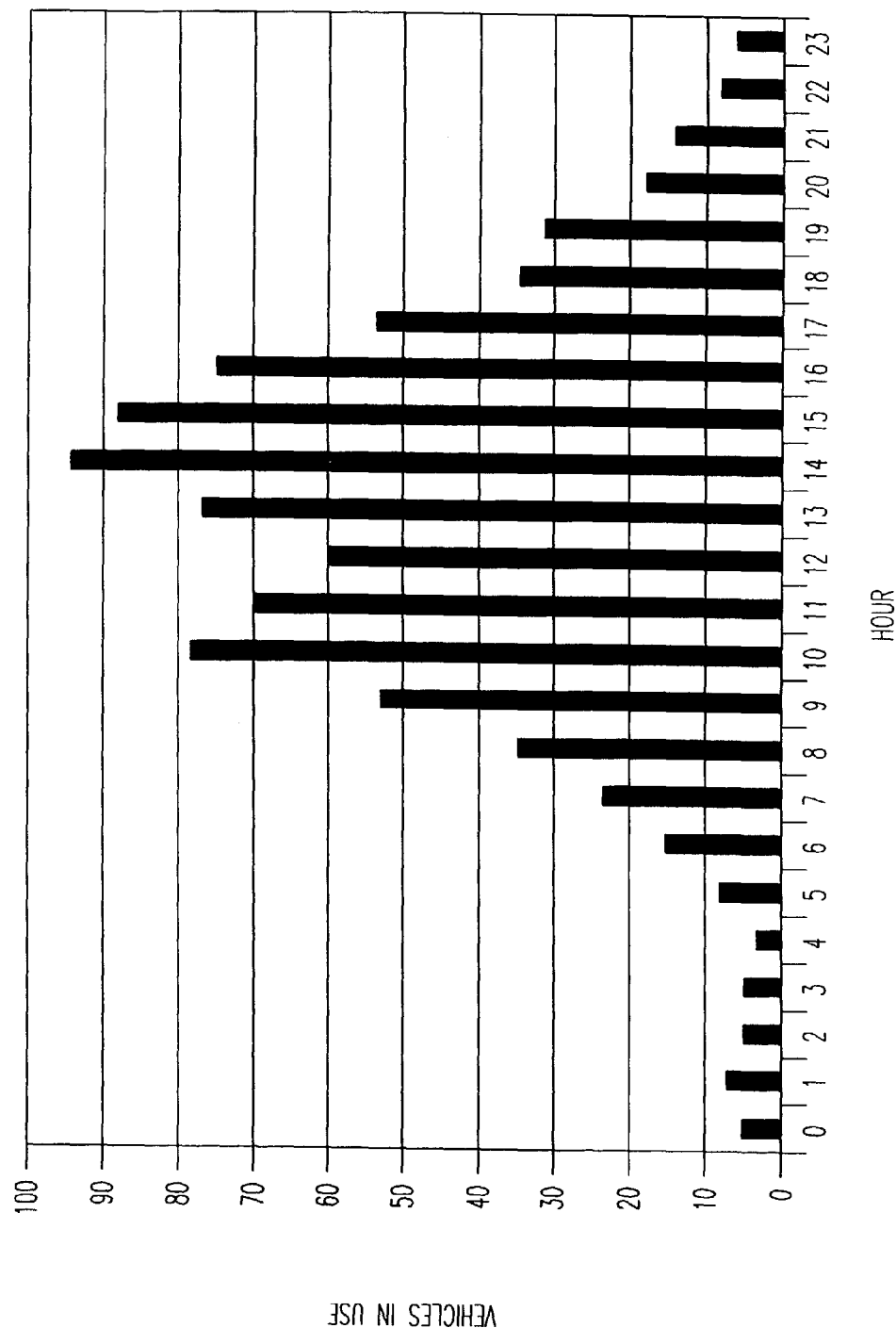
FIG. 15 is an exemplary chart indicating vehicle usage during the course of a 24-hour time period on the robust wireless communications system of FIG. 3.

FIG. 15 is an exemplary chart 1500 indicating vehicle usage during the course of a 24-hour time period on the robust wireless communications system of FIG. 3. As indicated, an aggregate of vehicles in use are provided during the course of the day. At 2:00 p.m. (i.e., hour 14), 93 vehicles were in use. As expected, the vehicles being utilized simultaneously during first shift are more than those being utilized during second and third shifts.

The combination of time and utilization from every vehicle in the fleet may be used to make numerous determinations about vehicle fleet utilization both real-time and historically. It should be understood that the utilization information of the assets may be based on any of the utilization information generated and stored by the asset communicator 120. Accordingly, the information is uploaded from the asset communicator 120 to the wireless infrastructure unit 225 and the management computer network 115 according to FIG. 4. Such information may include in-use/unassigned, motion/idle, speed, etc. Because the utilization information is collected and accumulated, and/or summarized based on time, vehicle, and/or operator, a wide variety of aggregate data may be generated by the supervisor. The robust wireless communications system 100c may further be utilized to determine the total number of different vehicle used each day, the maximum number of simultaneous vehicles used by group, and the total number of vehicles used by the group. It should be understood that other aggregate data may be collected and processed. The functional utility of the system is achieved by the fact that data collection is automated and wirelessly communicated.

Asset Location Monitoring

Another application that may be utilized on the robust wireless communications system 100c is asset location monitoring. Because the asset communicator 120 is intelligent, the asset communicator 120 is capable of determining its own location based on signal(s) received by the asset communicator 120. By having the asset communicators 120 determine their own locations or positions, the computations are distributed to the asset communicators 120, which reduces computational requirements for the management computing network 115 and bandwidth requirements for the robust wireless communications system 100c.

The signal(s) that are received by the asset communicators 120 may be either terrestrial or satellite based. In the case of a terrestrial signaling system, the asset communicators 120 may receive signals from multiple local monitors 110 and perform a triangulation computation as understood in the art. In one embodiment, an averaging algorithm as understood in the art may be utilized to correlate the percentage of messages received over time from a local monitor 110 with relative distances. In other words, if the asset communicator 120 receives transmissions from one local monitor 110 during every transmission, and from another local monitor 110 during half of the transmissions, then the asset communicator 120 determines that it is closer to the first local monitor 110 by an approximate percentage. The asset communicator may use configurable settings, such as filter time and conversion factors, to determine, based on the data, the meaning of the incoming signals. To set or change the configurable settings, manual, automatic, or event triggered processes may be utilized. The combination of the signals received from multiple local monitors with a current motion status of the asset communicator 120 also may be used to determine the location of the asset 105 (e.g., if the asset is not moving, the asset communicator knows that the RF readings cannot show the asset moving). In the case of utilizing satellite communication, a positioning system, such as the global positioning system (GPS), may be utilized. Other techniques, such as signal strength, direction finding, and dead-reckoning, may also be utilized by the asset communicator to determine location.

Figure 16:
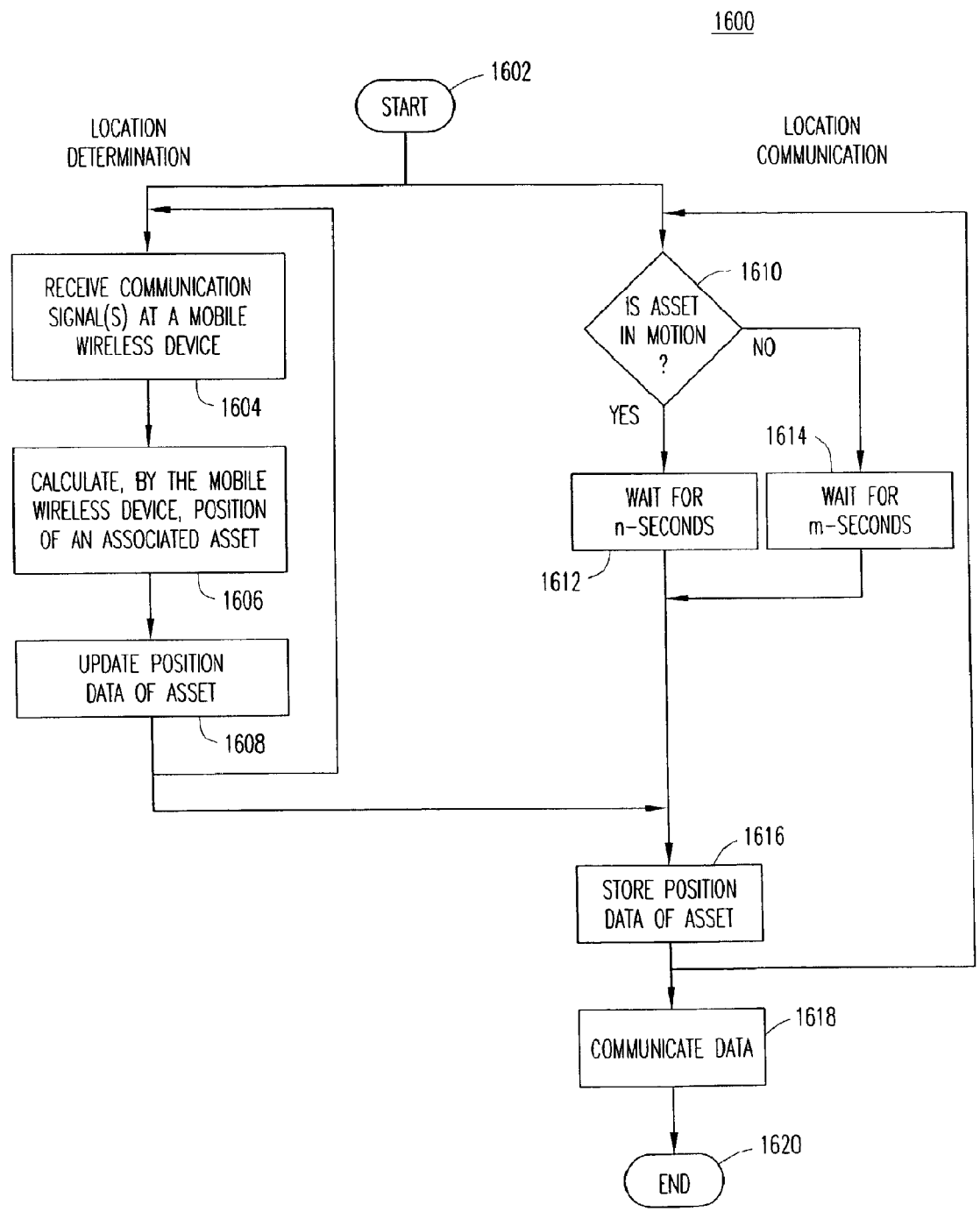
FIG. 16 represents an exemplary flow diagram for determining and communicating position of an asset utilizing the robust wireless communications system of FIGS. 3-5 and 6B.

FIG. 16 represents an exemplary flow diagram 1600 for determining and communicating position of an asset utilizing the robust wireless communications system of FIGS. 3-5 and 6B. The process starts at step 1602. At this point, two processes operate in parallel (i.e., location determination and location transmission processes).

At step 1604, communications signal(s) are received by a mobile wireless device 120. The mobile wireless device 120 calculates the position of the associated asset 105 at step 1606. Information, such as motion/idle status, odometer/ compass (e.g., dead-reckoning as understood in the art), or other sensory data, also may be utilized in calculating the position of the asset. At step 1608, the position of the asset 105 is updated in the mobile wireless device 120.

At step 1610, a determination is made as to whether the asset is in motion. If the asset is in motion, then at step 1612, a wait time is set to n-seconds. Otherwise, at step 1614, if the asset is idle, the wait time is set to m-seconds. At step 1616, the position of the asset, as determined at step 1608, is stored by the mobile wireless device 120 in a location database as provided in TABLE 5.

TABLE 5

Vehicle Location Information

Transaction Type Specifier
Transaction Code
Vehicle Number
Driver ID
Current Location Start Time
Operator ID
Current Time
Location Reading
Engine State
Battery Level TABLE 5 is an exemplary list of data elements stored in an asset location database on the asset communicator 120. As shown, a transaction type specifier, transaction code, vehicle number, driver ID, current location start time, current time, location readings, engine state, and battery level may be stored in the asset location database. Additionally, the vehicle location information may include a utilization status of the vehicle. In one embodiment, the current driver ID may itself provide the utilization status, whereby if the current driver ID is not specified (e.g., −1), then the vehicle is identified as being unutilized. Each time that location of the asset is stored, a transaction code may be assigned to form a dataset. And, by associating asset location with vehicle number and driver ID, the supervisor of the robust wireless communications system may determine an operator utilizing a particular vehicle at any given point in time or determine the location of vehicles that are unutilized at any given point in time.

The data of TABLE 5 is communicated from the mobile wireless device 120 to the wireless infrastructure 202 at step 1618 as provided by the communication process of FIGS. 6B and 9. In other words, the position data may be stored by the mobile wireless device 120 for an indefinite period of time based on the communication link status with the wireless infrastructure 202, thereby providing for a substantially continuous position tracking system. The process ends at step 1620. As shown, the location determination process is continuous (i.e., after step 1608), and the location communication process repeats upon storage of the position data at step 1616.

The wait times for an asset that is idle or stationary may be set to a very long time period (e.g., once per hour), and an asset that is in motion may have a shorter wait time, such as once per two seconds, for example. Alternatively, wait time may be independent of motion status of the asset. The wait times are system parameters that may be altered by the system administrator. It should be understood that in the event that an operator logs into the mobile wireless device 120, that the wait time may be automatically updated such that the mobile wireless device 120 determines its position at the shorter wait time (i.e., higher frequency rate). It should also be understood that the storage of the position of the asset in the mobile wireless device 120 of step 1616 may be performed based on the wait time. By storing the location information at lower frequency rates, the memory of the mobile wireless device 120 is less apt to be filled during periods of the asset 105 being idle. Also, because the asset communicator 120 is continuously determining its location, if the associated asset 105 moves to a specific area, such as cell 111, between intervals, the asset communicator 120 may communicate or take other actions, such as shutting down the asset 105. For example, if a forklift enters a classified area of a factory (regardless of the wait time), the asset communicator 120 may shut down the forklift and communicate an alert message to the supervisor.

OSHA Compliance

The robust wireless communications system 100c provides for OSHA compliance with regard to the vehicle safety checklist information at the vehicle to keep an automatic record of safety checklists and identify safety issues. The asset communicators 120 allow checklist information to be customized by vehicle, and allows for the information to be updated wirelessly and automatically. The wireless communicator 120 allows an operator to answer the OSHA questions (e.g., operational status of a vehicle) independent of the asset communicator 120 being in active communication with the wireless infrastructure 202. In other words, the OSHA related questions may be answered when out-of-range of the wireless infrastructure and the answers may be communicated with the wireless infrastructure 202 upon the asset communicator 120 re-establishing a communication link with the wireless infrastructure 202.

The OSHA compliance system is bi-directional in that downlink and uplink communication is utilized to provide the questions and receive the responses. A supervisor may utilize the supervisor interface 205 to (i) generate lists of OSHA questions and possible responses, and (ii) associate each asset with the appropriate list of OSHA questions. TABLE 6A contains the specific OSHA questions and possible responses for each question list. Each asset may be associated with the appropriate list of OSHA questions using the data in TABLE 6B. As shown in TABLE 6B, the vehicle profile information may include vehicle type, vehicle number, and question list number, for example. Additionally, a transaction code may be stored with each dataset as entered and/or amended for the OSHA questions list details and vehicle OSHA question list information. And, because the database is relational, the questions may be specifically targeted toward a vehicle type and/ or vehicle number.

TABLE 6A

OSHA Question list Details

Transaction Type Specifier
Transaction Code
Question List Number
Question Number
Question Text (e.g., "Horn operational?")
Response Text (e.g., "Yes", "No")
Response Severity (e.g., "Normal", "Critical")

TABLE 6B

Vehicle Profile Information

Transaction Type Specifier
Transaction Code
Vehicle Number
Vehicle Type
Question List Number
Impact Threshold
Low Battery Threshold
Vehicle Specific Behavior On the downlink side, once the OSHA question databases are formed, the datasets may be downloaded to asset communicators 120 utilizing the robust wireless communications system and download protocol of FIGS. 4 and 6A for synchronization of the OSHA question list for the asset communicators 120. Each asset communicator 120 stores the OSHA questions of TABLE 6A associated with the question list number of TABLE 6B associated with the vehicle number and/or vehicle type. If the question list number is updated for the asset communicator 120 associated with a particular vehicle number/vehicle type, then the asset communicator 120 updates and/or replaces the OSHA questions with the updated set of questions associated with the updated question list number.

If a hierarchical question list is utilized, then questions of TABLE 6A associated with the question group number of TABLE 6B may be associated with the vehicle type or associated with a question trigger and/or response action that is valid for the associated vehicle type. It should be understood that the question lists may be assigned and/or associated with individual assets, asset types (e.g., fork lifts), individual operators, groups of operators, events, conditions, or any other data related to the assets 105 or operators of the assets 105. The assignment process may be performed by designating an identifier in one database and utilizing the same identifier in a second database to form a relation therebetween as understood in the art.

The uplink communication follows the protocol of FIGS. 4 and 6B for performing synchronization of the responses from operators answering the OSHA questions. Again, upon the asset communicator 120 establishing a communication link to the wireless infrastructure 202, the datasets stored by the asset communicator 120 are transmitted from the asset communicator 120 to the wireless infrastructure 202. The supervisor may utilize the supervisor interface 205 to review and monitor results of the OSHA questions.

Figure 17A:
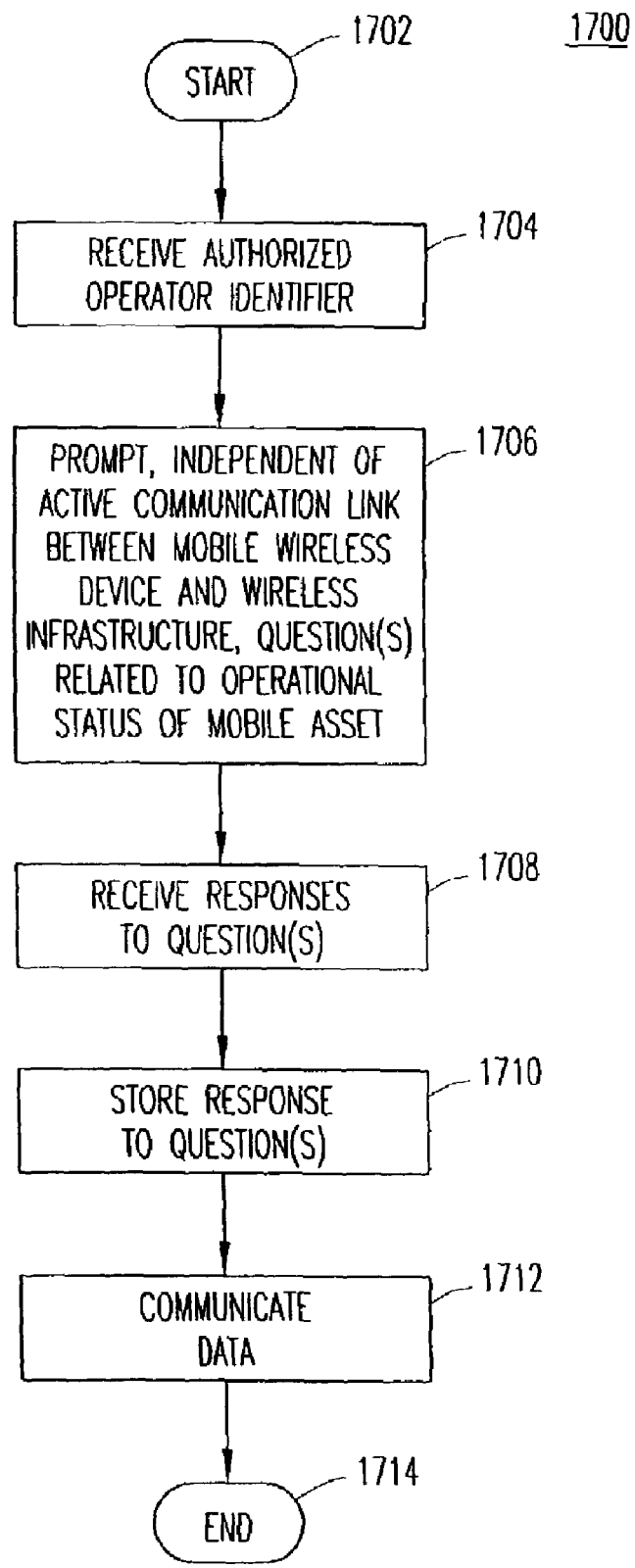
FIG. 17A is an exemplary flow diagram for performing the OSHA compliance utilizing the robust wireless communications system of FIGS. 3-5, 6A and 6B.

FIG. 17A is an exemplary flow diagram 1700 for performing the OSHA compliance utilizing the robust wireless communications system of FIGS. 3, 6A and 6B. The process starts at step 1702. At step 1704, an authorized operator identifier is received by the asset communicator 120. At step 1706, question(s) related to operational status of the mobile asset 105 may be prompted independent of an active asset communication link 130 between the asset communicator 120 and wireless infrastructure unit 225. Additionally, the asset communicator may use previously stored responses to the OSHA questions to limit the prompting of questions. For example, depending on the OSHA requirements, the checklist only may be required for every new operator, once per shift, once per every 24 hours, etc. Also, the OSHA questions may be prompted having a predetermined duration between each prompt to encourage an operator to properly inspect the asset 105 rather than simply assuming the answer. Therefore, because the asset communicator 120 is intelligent and is capable of storing data therein, OSHA compliance may be performed in accordance with specifications of a given business. Therefore, the asset communicator 120 may not prompt questions for answers if not required at that time. Additionally, based on certain conditions (e.g., mileage) of the asset 105, a different checklist may be prompted on the asset communicator 120. At step 1708, responses to the questions are received by the asset communicator 120. The responses may be entered using a keypad, touch screen, or verbal input (if the asset communicator 120 utilizes voice recognition software), for example. At step 1710, the responses to the questions are stored by the asset communicator 120. The responses may be communicated at step 1712 using the communication technique of FIG. 9. At step 1714, the process ends.

In addition to the questions being answered by the operator, different questions may be associated with different levels of severity as defined in TABLE 6A. The levels of severity may be determined by system parameters maintained by a supervisor. Upon a question being answered in a certain way, different results may occur. For example, if the answer to the question of whether the headlights are working is negative, then the asset communicator may perform an immediate action in shutting down the associated mobile asset 105 or performing another action such as entering a low-speed mode or turning on a siren or light. A less immediate action may result in an event occurring based on a particular answer. For example, a negative response to the question of whether the headlights work may result in an e-mail, page, or other notification being communicated to the management computer network 115 to indicate that maintenance is required for the particular mobile asset to which the asset communicator 120 is coupled.

Still yet, because the components (e.g., management computing system 302, wireless infrastructure device 202, and asset communicator 120) of the robust wireless communications system 100c are each capable of making decisions, any of the components individually or combined may determine that responses to the OSHA questions have not been answered in a timely manner (i.e., a business rule has been violated). If such an event occurs, action may be taken by one or more of the components. For example, if a response to an OSHA question or questions is not received by an asset communicator 120, then the asset communicator 120 may shut down the vehicle, notify the supervisor of the non-responsive operator, and/or generate a visual and/or audible display, such as a light or siren. Additionally, the management computing system 302 may communicate a message to all or some of the assets 105 that prevents the non-responsive operator from having access thereto. Additionally, the supervisor may receive a message, page, or e-mail indicating the non-responsiveness of the operator.

Conventional checklists, including paper and electronic checklists, typically utilize a single checklist that is to be completed from the first question to the last. While the checklists may change over time, only one checklist exists at any given time on each asset 105. The checklist may be different on each type of asset 105, but is not related to the specific operator utilizing the asset 105.

To make the checklists more business flexible, hierarchical question lists may be utilized to obtain more specific information in a more flexible way than can be obtained from conventional checklists. Rather than a fixed, sequential list, the hierarchical list permits changing of questions, based on responses, operators, or other vehicle or date-based conditions. For example, two different types of operators using the same asset 105 may be presented with different checklists. Additionally, should one response signify an issue that requires clarification, additional, more detailed questions may be asked of the operator. Alternatively, if the same response does not need more clarification, then either no or different questions may be asked of the operator. Further, if the asset (e.g., lift truck) is in a specific location or encounters an impact, a new checklist may be displayed.

Figure 17B:
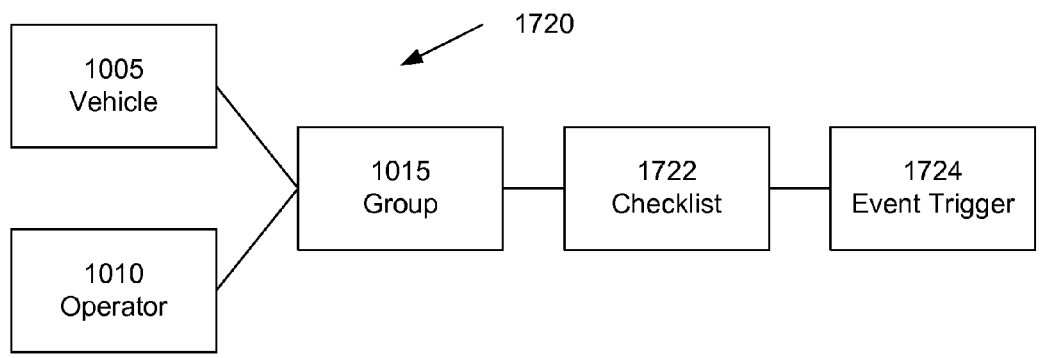
FIG. 17B is an exemplary block diagram for integrating a checklist database and event/trigger database into the relational databases of FIG. 10.

FIG. 17B is an exemplary block diagram 1720 for integrating a checklist database 1722 and event/trigger database 1724 into the relational databases of FIG. 10. By using relational databases, the flexibility of the checklists may be increased as a function of the information stored in the vehicle database 1005, operator database 1010, group database 1015, event/trigger database 1724, or any combination thereof.

The robust wireless communications system 100c enables creation and management of the hierarchical questions. The infrastructure for creating the questions hereby enables these hierarchical questions. In one such implementation, software, as understood in the art, executed by the supervisor interface 205 of the management computer system 115, permits the administrator to designate the question text, the response option text, and response option actions. Response option actions may include: proceed to next question, branch to question N, end checklist, and deactivate vehicle, for example. Such response actions permit a tree-like structure for the checklist questions.

The software further permits the creation of numerous such checklists, where each checklist is associated with a vehicle type and/or operator type. Alternatively, the checklist may be associated with a vehicle-identified condition. By assigning a checklist to an equipment type or single piece of equipment, the equipment is designated to ask the single checklist to any operator. By assigning a checklist to an operator type or single operator, the same checklist is presented to the operator regardless of the equipment operated. By assigning the checklist to a combination of equipment and operator types, different operators on the same vehicle may be presented with different checklists. By assigning a checklist to a condition, the vehicle can ask questions when certain events take place, including, but not limited to, certain dates or times, certain locations, after an impact is detected, when battery voltage is low, or when a monitored meter level reaches a threshold. In one embodiment, the assignment of the check list may be performed by selecting from a list of assignments (e.g., operator group or asset type).

In the event of an assigned condition occurring, for example, when a battery voltage is low, a checklist can ask 'Did you notice that the battery is low?' with responses: 'Yes, but I'm busy', 'No—I'll recharge it now', 'Yes—but it is OK'. Alternatively, after an impact, an operator may be asked, 'Did the recent impact create damage?' with responses: 'Yes' and 'No'. After a certain amount of motor hours is recorded on the equipment, the question 'Please bring vehicle in for maintenance' may be asked, with responses: 'Not now' and 'OK'.

Figure 17C:
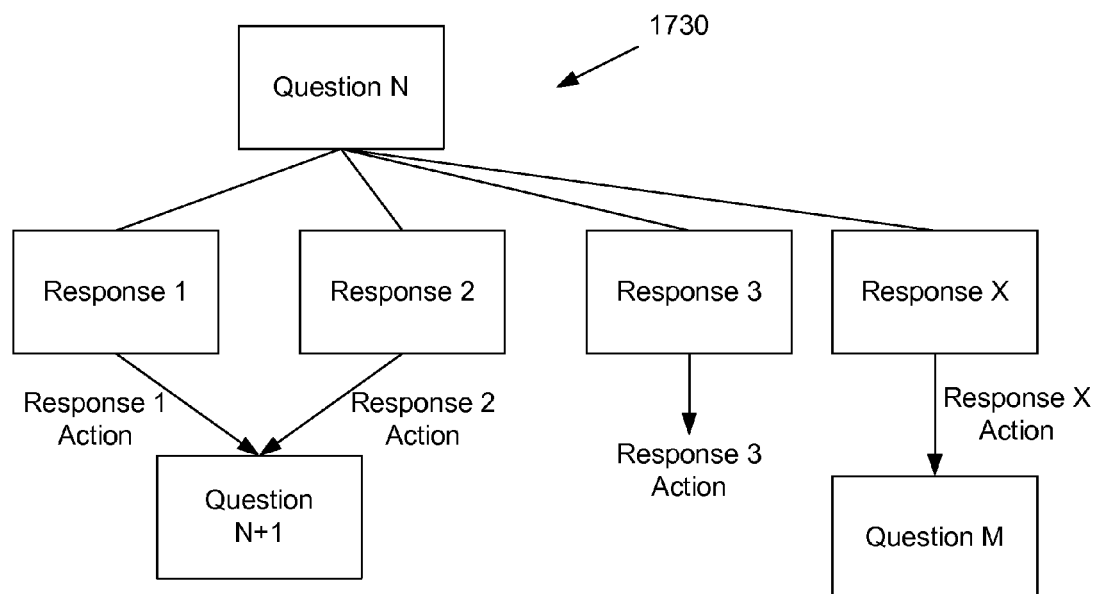
FIG. 17C is an exemplary tree structure representative of a question list that may be utilized by the asset communicators of FIG. 1 to ask questions directed to OSHA or for other purposes.

FIG. 17C is an exemplary tree structure 1730 representative of a question list that may be utilized by the asset communicators 120 to ask questions directed to OSHA or for other purposes. In downloading the question lists to the asset communicators 120, the robust wireless communications system 100c is used to transfer pertinent questions and response text and actions to each asset communicator 120 associated with the assets 105, whereby only checklists relevant to the particular type of assets are stored on the associated asset communicator 120. Alternatively, asset communicators 120 may store multiple checklists if each checklist is defined to be associated with particular types of assets 105.

In order to provide the questions by operator type, the asset communicator 120 collects the operator identifier from the operator utilizing the asset 105. If the defined checklists of the asset 105 include operator-related questions, then, in one embodiment, the processor 328 of the asset communicator 120 determines the specific checklist or checklists to ask the operator for OSHA compliance or other business purposes. The operator may interface with the checklist via the display 333 and/or keypad 332 to answer questions. The checklist may be presented in a graphical user interface (GUI) format or text based format. If a GUI format is utilized, then selection menus may be presented for the operator to select an answer. In response to the operator selecting answers to the questions of the checklist, an appropriate action is processed by the processor 328 to proceed to presenting the subsequent question and responses. As shown, for example, Question N may have multiple alternative responses (i.e., Response 1, Response 2, . . . , Response X). Based on the response, a specific response action may be taken. The response action may be predetermined, but alternatively may be altered during operation of the asset based on time and/or location, for example. The same questions (e.g., Question N+1), alternative questions (e.g., Question N+1 or Question M), or no questions may be followed by the response action in response to the operator answering the questions.

For each response, the specific question and response identifier are stored and/or transmitted to the wireless infrastructure 202 and management computing system 302. In one embodiment, the asset communicator 120 stores each response in internal memory until the final checklist question is asked, as determined by a response action 'end-of-checklist'. Once the first checklist is complete, if a second checklist is relevant, due to the operator, vehicle or vehicle condition, it may be presented in the same manner as the first checklist. In response to the question/response combinations being stored, the information may be uploaded via the robust wireless communications system 100c to the database (e.g., database 316a) for storage and further analysis utilizing the communications of FIG. 4. In another embodiment, each response is transferred immediately to the wireless infrastructure 202 utilizing the communications of FIG. 5 and the next question may be transferred back to the asset communicator 120 of the asset 105 for presentation.

Two-Way Text Messaging

Two-way text messaging may be utilized on the robust wireless communications system of 100c in accordance with the communication technique of FIGS. 4, 6A, 6B, and 9. As suggested, the two-way text messaging is both a downlink and uplink communication technique that allows a message to be communicated to any vehicle, operator, group, or all assets. Each message may be associated with a set of responses communicated therewith. The receiver of the message may select one or more responses and communicate the responses back to the issuer of the message. Status information, such as time of receipt, time that the message is read, time of each response, and time when message is deleted, may also be communicated to the issuer. Two-way text messaging further may be used to set work instructions or other dispatch information to an operator of the asset 125. One exemplary use of two-way messaging includes warehouse management instructions. Additionally, the two-way text messaging may be used for the operator to communicate responses to the supervisor issuing the messages. While two-way text messaging may be performed utilizing the robust wireless communications system 100c, one-way text messaging or paging may also be performed on the system. As understood in the art, one-way text messaging does not require that information be communicated back to the device that issues the one-way text message.

Figure 18:
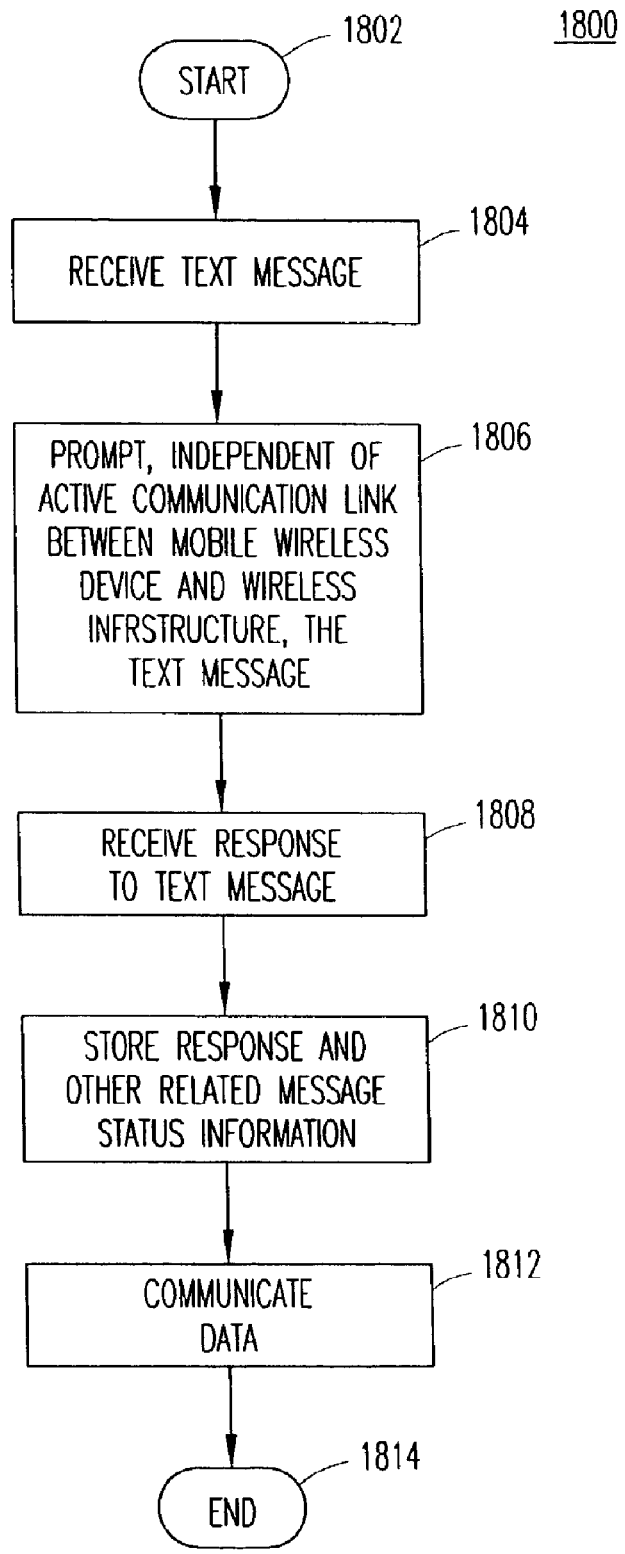
FIG. 18 is an exemplary flow diagram providing a process for performing the two-way messaging on the robust wireless communications system of FIG. 3.

FIG. 18 is an exemplary flow diagram 1800 providing a process for performing the two-way messaging on the robust wireless communications system 100c. The process starts at step 1802. At step 1804, a text message is received via the downlink communication process of FIG. 6A. The mobile wireless device 120 only stores text messages associated with the vehicle number, current operator, or group identifier. All broadcast text messages are stored. Other related message status information, such as time of receipt, may be stored. At step 1806, the message is prompted on the mobile wireless device 120 on the display 333 independent of an active communication link between the mobile wireless device 120. Typically, an operator uses the keypad 332 and display 333 to read the contents of the text message and view the optional responses. The time that the text message is read may additionally be stored. At step 1808, the operator may respond to the text message, and the response and other related message status information may be stored at step 1810. The operator may respond multiple times to the same text message. Additionally, actions may be executed by the mobile wireless device 120 based on the response(s) to the text messages. For example, a response to a text message may cause the mobile wireless device 120 to shut off the associated asset. At step 1812, the stored data is communicated using the communication technique of FIG. 9. Once the responses and status data are stored in the management computing system database 312a, a supervisor may view the data using the supervisor interface 205.

Battery Monitoring and Charging

A battery monitoring and charging application is capable of utilizing the robust wireless communications system 100c. Two concepts exist for the battery monitoring, including: (i) notification to the operator that the battery voltage level is low, and (ii) notification as to (a) which charger to mount the battery and (b) which charged battery to install in the asset.

Regarding the first concept (i.e., notification to the operator of low battery voltage), the battery monitoring and charging application provides information to an operator of a vehicle to which a battery is coupled, and utilizes both the downlink and uplink aspects of the robust wireless communications system 100c. Additionally, the communication techniques of FIGS. 4, 5, 6A, and 6B may be utilized.

In the downlink direction, the supervisor may set a low threshold value, such as 10.7 volts, for the battery voltage by utilizing the supervisor interface 205. The low threshold value is a system parameter that is downloaded to the asset communicator 120 using data from TABLE 6B and the downlink techniques of FIG. 4.

Figure 19:
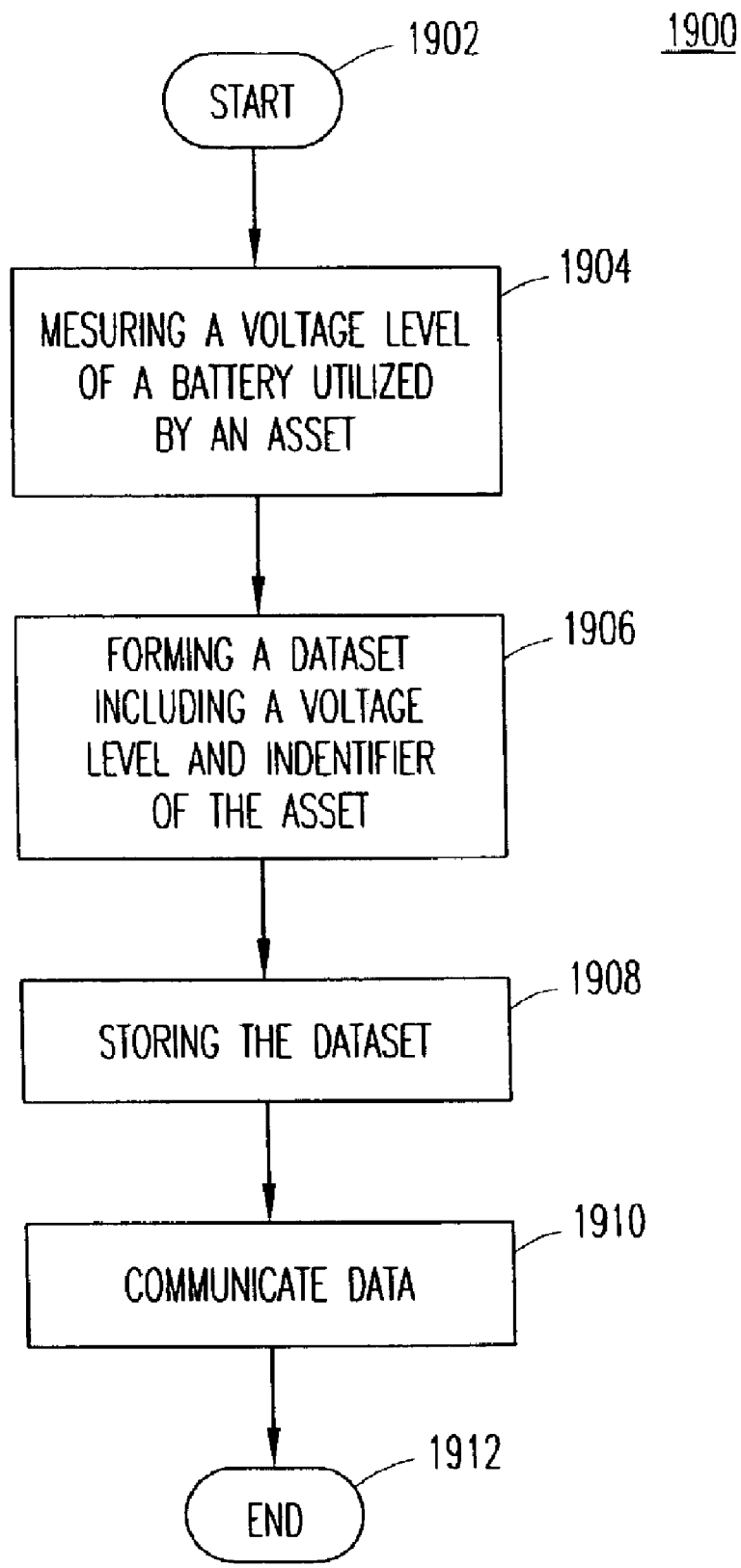
FIG. 19 is an exemplary flow chart providing a process for measuring battery voltage of an asset utilizing the robust wireless communications system of FIGS. 3, 4, and 6B.

Referring now to FIG. 19, an exemplary flow chart 1900 provides a process for measuring battery voltage of an asset utilizing the robust wireless communications system of FIGS. 3 and 6B. The process starts at step 1902. At step 1904, a voltage level of a battery utilized by the asset is measured. The voltage level may be measured by the asset communicator 120 or by an external measuring device. Further, the voltage level may be measured at the battery or remotely (i.e., at another location within the asset and electrically coupled to the battery).

At step 1906, a dataset, including a voltage level and identifier (e.g., vehicle identifier) of the asset, is formed based on the threshold voltage level being surpassed. Additionally, the dataset may include data elements provided in TABLE 7, including a transaction code that is temporal with respect to other related datasets, transaction type specifier, event time, driver ID, asset assignment status, battery threshold, and location reading. A visual and/or audible indicator may be used to notify the operator of the vehicle that the battery level is low. The operator may respond to the indicator utilizing the process of FIG. 20, discussed hereinafter. The dataset is stored at step 1908, and communicated at step 1910 in accordance with the communication technique of FIG. 9. The process ends at step 1912.

TABLE 7

| Low Battery Information |
|---|
| Transaction Type Specifier |
| Transaction Code |
| Vehicle Number |
| Event Time |
| Driver ID |
| Assignment Status |
| Battery Level |
| Battery Threshold |
| Location Reading |

Figure 20:
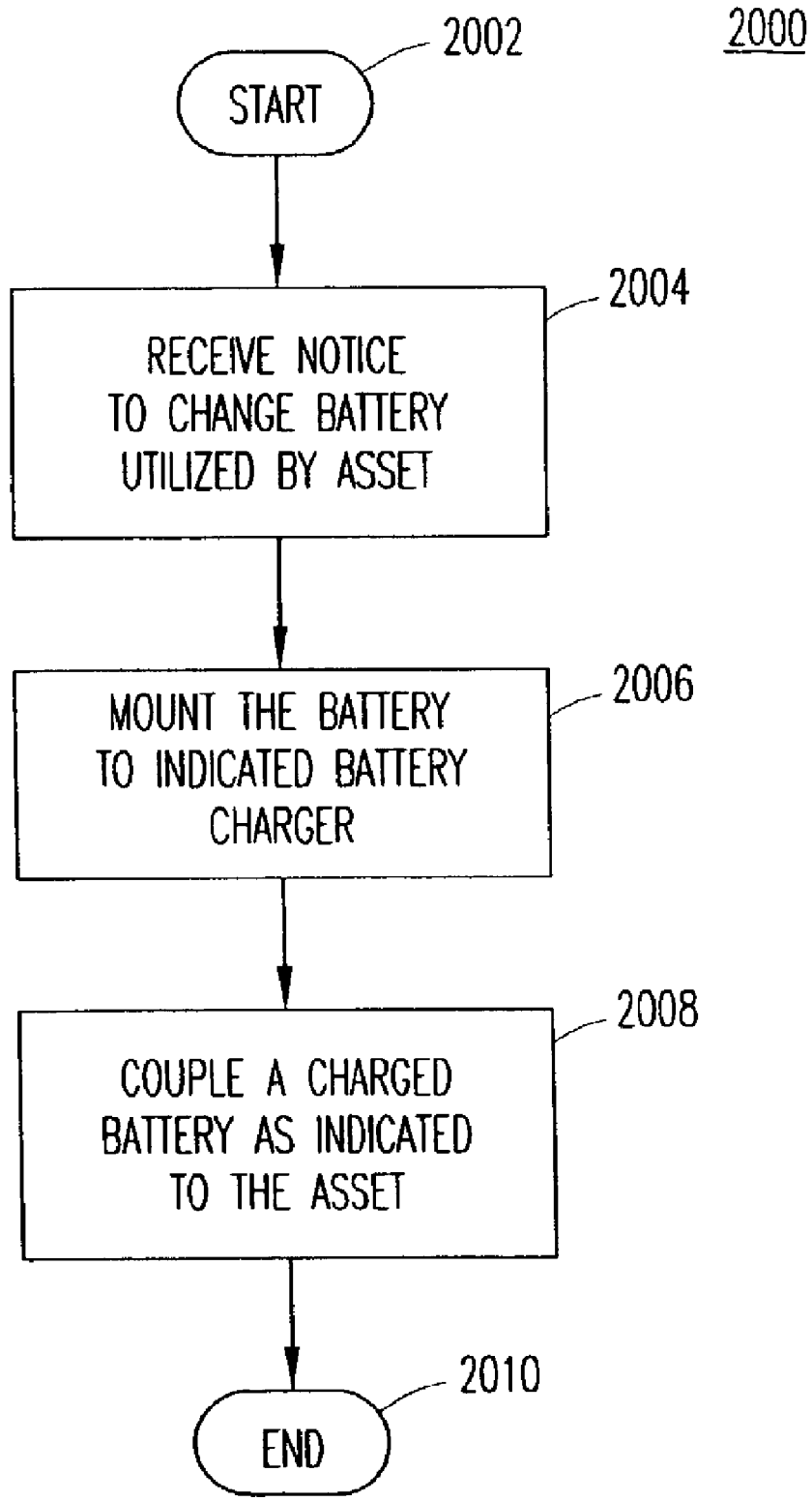
FIG. 20 is an exemplary flow diagram 1900 providing for a process of changing the battery with a charged battery utilizing the robust wireless communications system of FIGS. 3-5, 6A, and 6B.

Referring now to FIG. 20, an exemplary flow diagram 2000 provides for a process of changing the battery with a charged battery utilizing the robust wireless communications system of FIGS. 3-5, 6A, and 6B. The process starts at step 2002. The operator of the asset 105 issues a notice to the asset communicator 120, utilizing the keypad 332, for example, that the associated battery should be changed with a charged battery. A message may be communicated from the asset communicator 120 to the management computing system 302 using the immediate messaging technique of FIG. 5. At this point, the management computing system may determine the appropriate replacement battery and charging station for the discharged battery to be placed. At step 2004, a message or notice may be received by the asset communicator 120 from the management computing system 302 using the immediate messaging technique of FIG. 5. The message may include: (i) replace battery, (ii) specific battery charger to mount the discharged battery, and (iii) specific charged battery to install into the asset 105.

Figure 21:
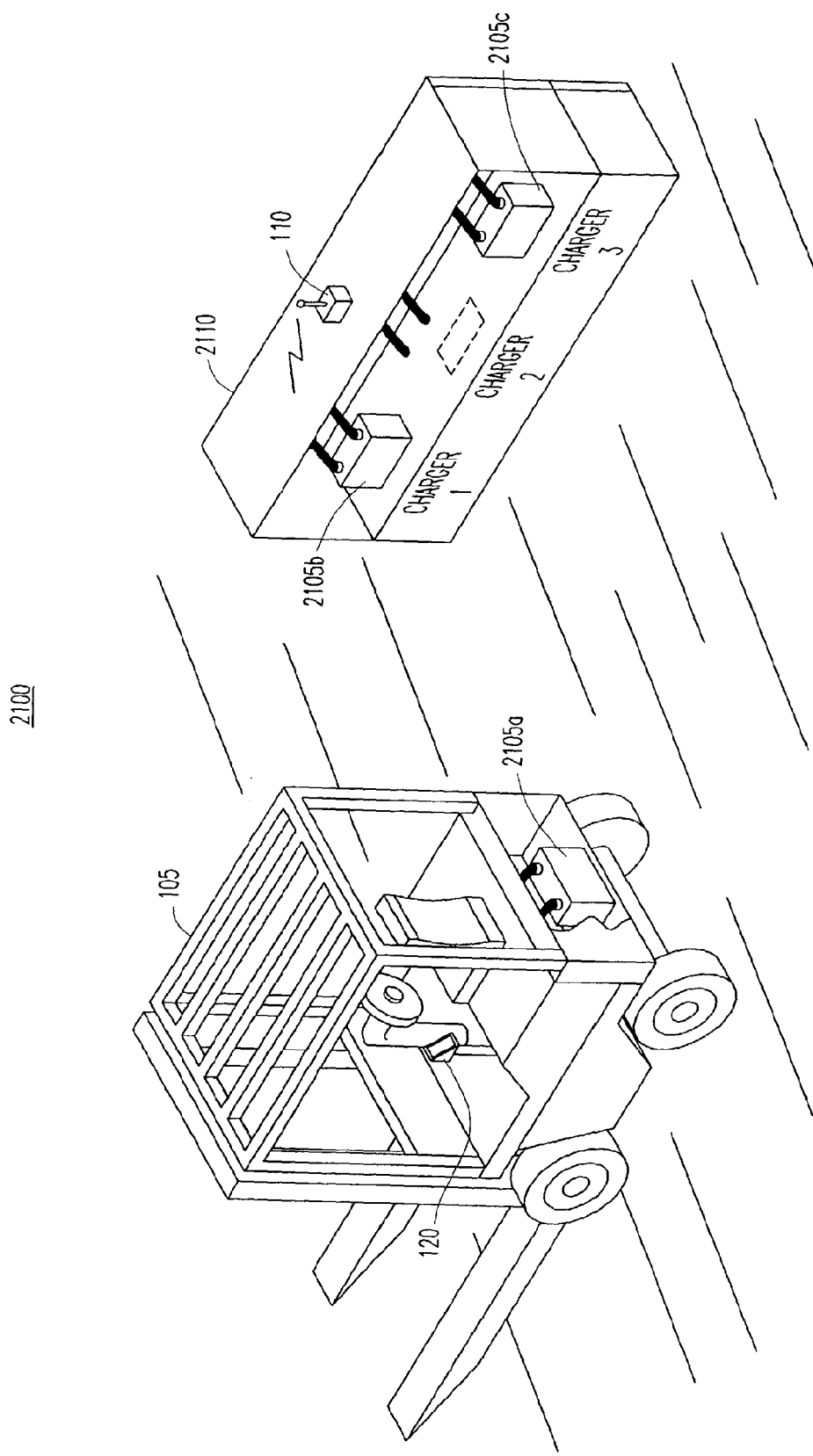
FIG. 21 is a typical working environment for a mobile asset utilizing the robust wireless communications system of FIG. 3 to charge and replace a battery.

Referring now to FIG. 21, a typical working environment 2100 is provide for a mobile asset 105 utilizing the robust wireless communications system of FIG. 3. As shown, the mobile asset 105 includes the asset communicator 120 and a battery 2105a for operating the mobile asset 105. Upon the operator receiving the message via the asset communicator 120, the operator removes the battery 2105a and replaces it with a charged battery, such as a charged battery 2105b or 2105c mounted on a battery charger station 2110 as indicated by the message. The battery charger station 2110 may include a battery voltage monitor device (not shown) as understood in the art to monitor battery voltage of the batteries being charged. A local monitor 110 may be coupled to the battery voltage monitor device to communicate status of batteries being charged to the management computer network 115 so that the management computer network 115 may maintain the status of all batteries being utilized by the assets 105.

Referring again to FIG. 20, at step 2006, the battery 2105a is mounted to the battery charger specified by the message. At step 2008, the charged battery 2105b, for example, indicated by the message is installed into the mobile asset 105. The asset communicator 120 further may prompt the operator to verify that the battery is successfully changed as instructed. If the operator is unable to change the battery as instructed, then the operator may override the instructions by entering (i) which battery charger station the discharged battery was placed, (ii) which charged battery was placed into the mobile asset 105, and/or (iii) a message indicating other occurrences in changing the battery. A swap confirmation message may be stored by the asset communicator 120 and communicated to the wireless infrastructure 202 using the communication technique of FIG. 9. The process ends at step 2010.

Impact Monitoring

Figure 22:
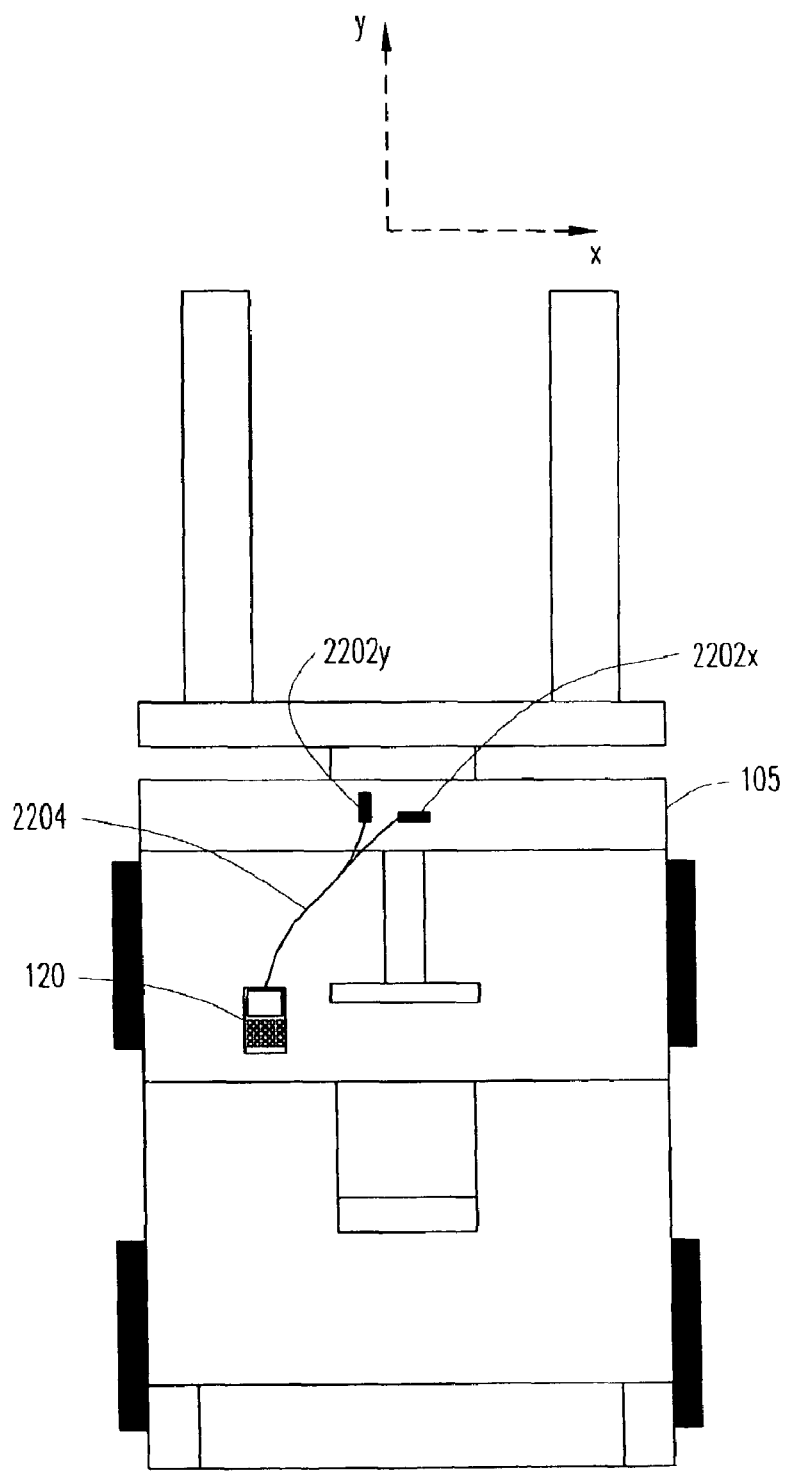
FIG. 22 is a top view of an exemplary mobile asset of FIG. 1 capable of measuring impact of the mobile asset.

FIG. 22 is a top view of an exemplary mobile asset 105 capable of measuring impact of the mobile asset 105. To measure impact, impact sensors 2202x and 2202y (e.g., accelerometers) are mounted to the mobile asset 105 and electrically coupled via the wires 2204 to the asset communicator 120 associated with the mobile asset 105. As shown, the impact sensor 2202x is oriented in the x-axis direction, and the impact sensor 2202y is oriented in the y-axis direction. By utilizing multiple sensors having different axes of orientation, the asset communicator 120 is capable of receiving impact signals from the impact sensors 2202x and 2202y, and determining the level, duration, waveform, and angle of impact. It should be understood that the axes of orientation for the sensors 2202x and 2202y may be different and that the asset communicator 120 may be programmed to compute the level and angle of impact based on the orientations as understood in the art. It should be further understood that other impact sensors may be oriented in different orientations (e.g., z-axis) and utilized to measure impacts from different directions (e.g., vertical).

Figure 23:
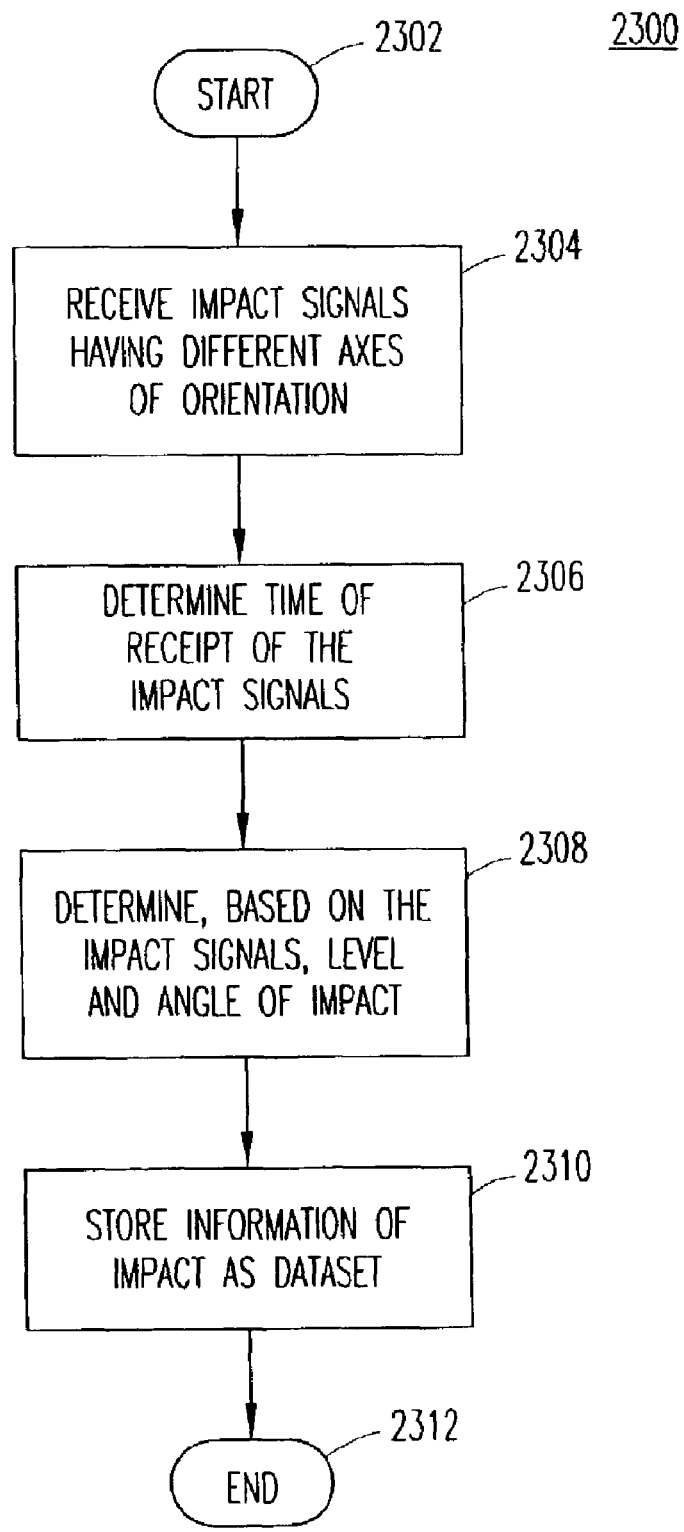
FIG. 23 is an exemplary flow diagram for monitoring of an impact to the mobile asset of FIG. 21.

FIG. 23 is an exemplary flow diagram 2300 for monitoring for an impact to the mobile asset 105 of FIG. 22. The process starts at step 2302. At step 2304, an impact between the mobile asset 105 and another object occurs, and impact signals having different axes of orientation are received. The impact sensors 2202x and 2202y may be position, velocity, acceleration, force, and/or impact sensors. The signals generated from the impact sensors 2202x and 2202y may provide parameters to the asset communicator 120 for computing the g-force of impact or any other relevant impact parameter, including duration, waveform, and profile of impact, which may be utilized to distinguish a true impact from a bump.

At step 2306, the time of receipt of the impact signals are determined. In the case of utilizing the impact information to alert a rescuer, for example, the time of receipt of the impact may be important in terms of rescue efforts. The time may also be critical in replaying the historical locations of assets at the time of the impact. At step 2308, the level and angle of the impact may be determined based on the impact signals. The angle of impact may be computed by a software program operating in the asset communicator 120 or management computing system 302, where the software program may convert the impact levels received in Cartesian coordinates (i.e., x, y values) to polar coordinates (i.e., r, θ values) to produce magnitude and angle of impact as understood in the art. At step 2310, information of the impact, including time, impact level, impact duration, impact profile, and impact angle, may be stored as a dataset. The process ends at step 2312.

TABLE 8 provides an exemplary list of parameters that may be stored with the dataset in an impact database. As discussed with regard to the robust wireless communications system 100c, a transaction code may be generated and stored with the dataset. Because the asset communicator 120 has other various pertinent information for impact analysis, such as driver ID, assignment status of the mobile asset 105, impact threshold (system parameter), engine state, and location, other relevant information may be included on the dataset. Of course, any other data stored or determinable by the asset communicator 120 may be included in the dataset.

TABLE 8

| Impact Information |
| --- |
| Transaction Code |
| Vehicle Number |
| Event Time |
| Driver ID |
| Assigned? |
| Impact Level |
| Impact Angle |
| Impact Thresholds |
| Engine State |
| Location Reading |

The dataset may be communicated from the asset communicator 120 to the wireless infrastructure unit 225 using the communication technique of FIG. 9. Because impact of a mobile asset 105 may involve personal injury, real-time communication may be important, so the immediate communication technique of FIG. 5 may be utilized to inform authorities. Receipt of the page by the management computer system 115 may trigger a notification to local authorities via a paging message, e-mail, or telephone call. An impact may be considered a violation of a business rule and trigger one or more events, such as preventing the operator involved in the impact from accessing the same or other vehicles. The asset communicator may also (i) shut down the vehicle, (ii) put the vehicle into a creeper mode so that vehicle may be moved if necessary, but not used as normal, or (iii) turn on a signal such as a light or siren. The dataset may provide the supervisor or authorities with information for reconstruction of the impact. For example, if a collision occurs between two monitored assets, then the cause of the collision may be determined by the data generated from both asset communicators 120. One scenario may include an unutilized vehicle recording an impact with a vehicle that is being driven by an identified operator.

Maintenance Monitoring

Scheduled maintenance of assets, including both fixed and mobile assets, may be managed by utilizing the robust wireless communications system 100c. The management computing system 302 may predetermine, forecast, or project an expiration date for a scheduled maintenance for the assets being managed by the management computing system 302 based on historical utilization information. Assets may also be scheduled based on responses from OSHA questions or by the asset communicator 120 sensing maintenance problems with the asset 105. Maintenance events also may be scheduled manually, such as by a maintenance supervisor. To determine the expiration date, the management computing system 302 may inspect the vehicle utilization information of TABLE 4 as stored in a database 312, for example, and extrapolate future utilization of the asset 105. Additionally, software may track global parameters for the assets 105 to determine the expiration date for the scheduled maintenance. Such global parameters may include mileage and hours of use, motion, and lift time, for example, as well as calendar time since last maintenance. Additionally, the system may prioritize based on scheduled maintenance discrepancies between the projected and scheduled maintenance times.

Figure 24:
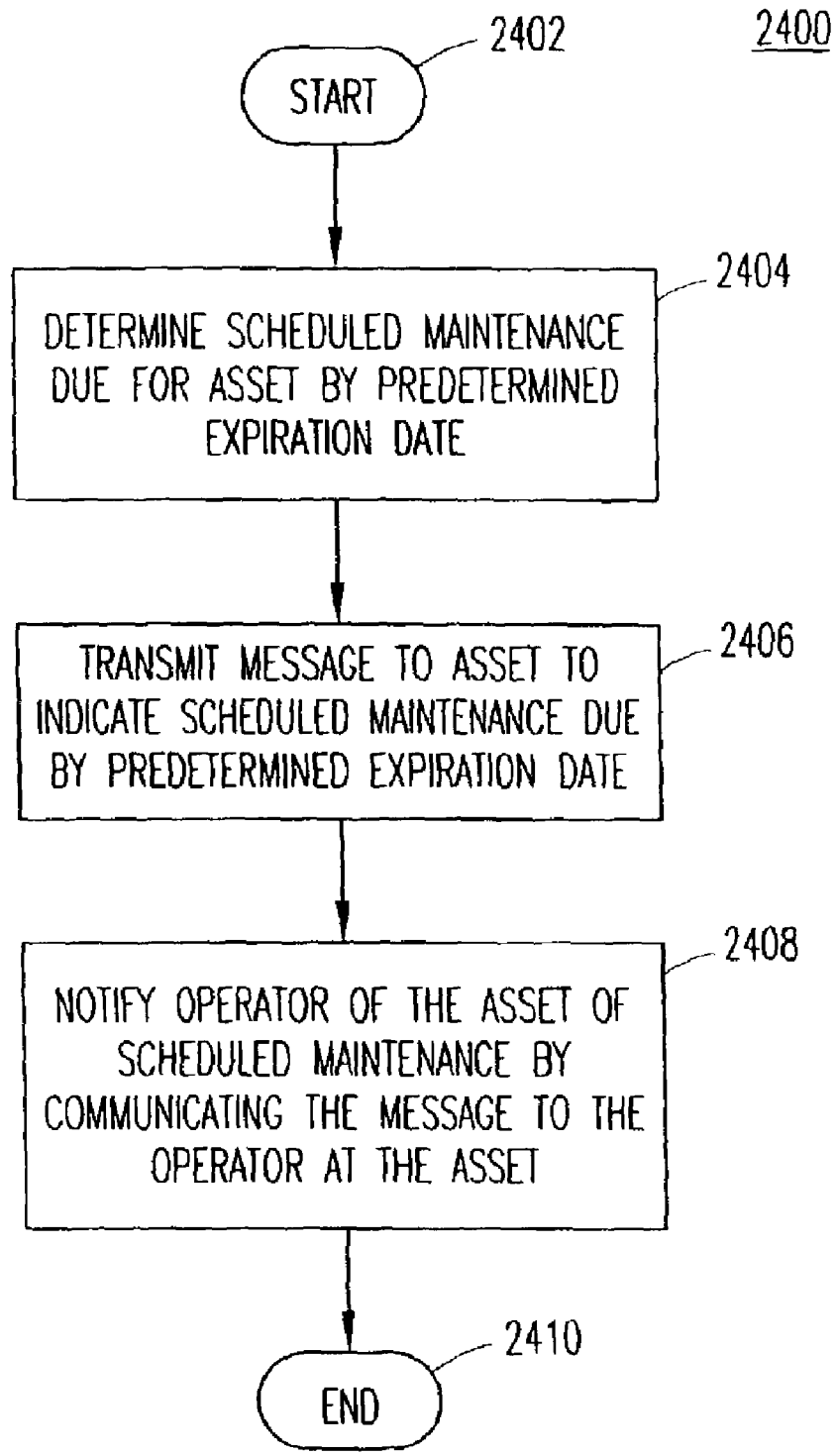
FIG. 24 is an exemplary block diagram indicative of a method for managing scheduled maintenance of assets utilizing the robust wireless communications system of FIG. 3 and communication technique of FIG. 4.

FIG. 24 is an exemplary block diagram 2400 indicative of a method for managing scheduled maintenance of assets. The process starts at step 2402. At step 2404, schedule maintenance due for an asset by a predetermined expiration date is determined. The determination may be made manually or automatically. At step 2406, a message is communicated to the asset using the communication technique of FIG. 9 to indicate that the scheduled maintenance is due by the predetermined expiration date. The message may be generated manually by a supervisor or automatically by the management computing system 302. In one embodiment, the message is transmitted to the asset communicator 120 via a paging message to ensure that the asset communicator 120 receives the message with an appropriate amount of time to have the scheduled maintenance performed on the asset.

At step 2408, an operator of the asset is notified of the scheduled maintenance by communicating the message to the operator at the asset via the asset communicator 120. The notification may be in the form of a visual display or an audible message. The process ends at step 2410.

The predetermined expiration date is a mandatory date for which maintenance is to be performed on the asset. In other words, the predetermined expiration date is the date by which the asset must be brought into a maintenance center, or a maintenance worker comes to the asset to perform the maintenance. Upon the asset having the scheduled maintenance performed, the asset communicator 120 and/or the management computing system 302 may be updated wirelessly. And, the asset communicator 120 may communicate with an onboard computer, such as an automobile computer, to assist with the diagnostics. If, however, the scheduled maintenance is not performed on the asset before the end of the predetermined expiration date, then the asset communicator 120 may disable, put into creeper mode, and/or disable certain features (e.g., lift). At this point, only an authorized user, such as a supervisor or maintenance personnel, may access the asset communicator 120 and operate the asset.

Indirect Communications System

Fleet management and tracking of vehicles, railcars, and trucks, for instance, may be a difficult venture due to situations of remote distribution of the assets. Additionally, due to system coverage constraints, it is possible that various assets within a fleet rarely or never come within range of a local monitor 110. For example, railcars often times do not come within a certain minimum range of a station for an asset communicator 120 to form an asset communication link 130 with a local monitor 110 located at the station. As another example, large automobile lots may preclude asset communicators 120 mounted to automobiles located at the back of the parking lot from maintaining an active asset communication link 130 with the wireless infrastructure unit 225, thereby preventing updating of the databases within the asset communicator 120 during potentially long periods of time. Additionally, certain wireless infrastructure units 225 may not include a communication unit 230a, 230b, or 230c. In such a case, the wireless infrastructure unit 225 communicates with at least one other wireless infrastructure unit 225 in order to indirectly communicate with the management computing system 302. For these and other reasons, an alternative embodiment of the robust wireless infrastructure 100c is provided.

Figure 25:
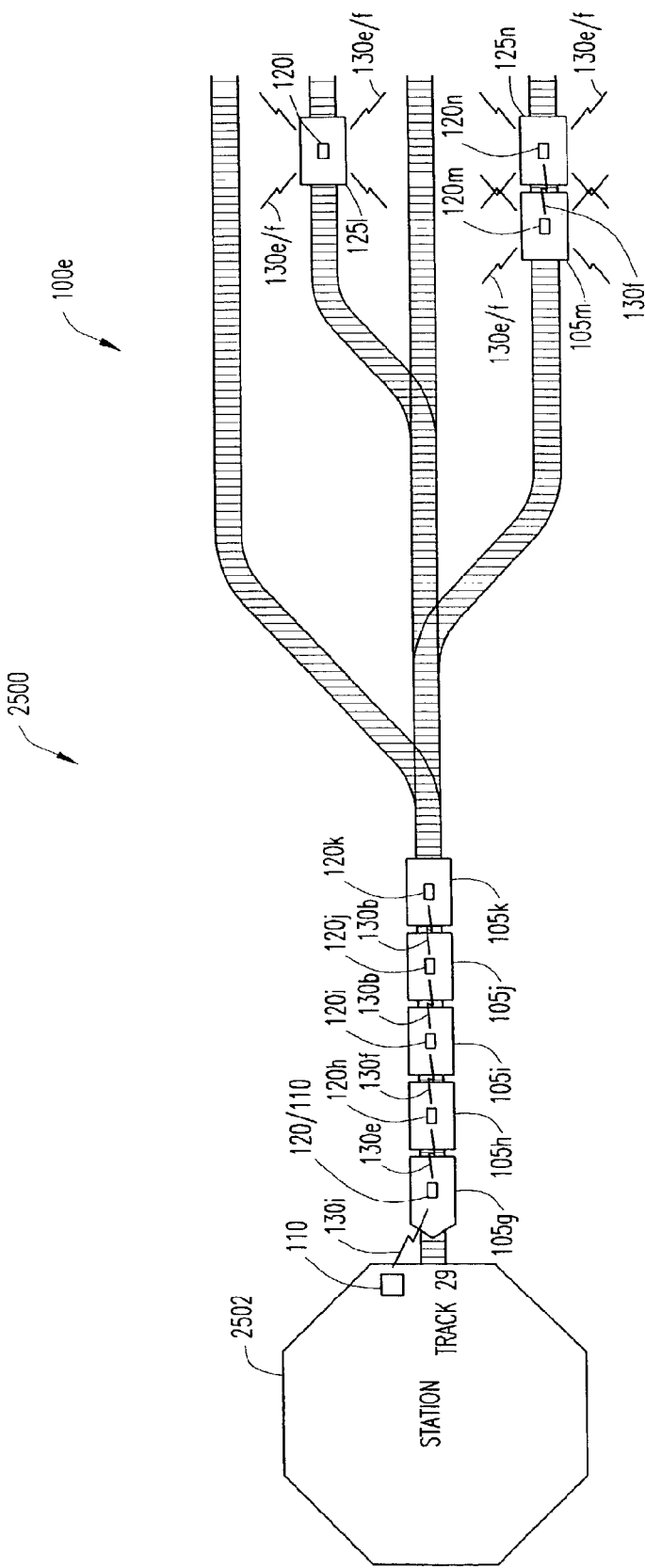
FIG. 25 is an exemplary embodiment of the wireless infrastructure of FIG. 1 for providing wireless communications on a remotely populated fleet of assets, such as railcars.

FIG. 25 is an exemplary embodiment of a wireless infrastructure 100e consistent with that of FIG. 1 for providing wireless communications on a remotely populated fleet of assets 2500, such as railcars. As shown, the assets include a locomotive 105g and attached railcars 105h-105k, and railcars 105l and 105m-105n unattached to the locomotive 105g. While the railcars 105h-105k may be within wireless communication range of the station 2502 and the local monitor 110, the railcars 105l-105n are unable to form a wireless communication link with the local monitor 110. However, it should be understood that the asset communicator/local monitor pair 120/110 may perform the same or similar functionality as the local monitor 110 having its databases (e.g., 312b, 314b, and 315b) being updated via the local monitor 110. It should be further understood that the hardware of the local monitor 110 may be substantially the same as asset communicator 120.

Coupled to the locomotive 105g is an asset communicator/local monitor pair 120/110, which is a device that performs both asset communicator 120 and local monitor 110 functions. Alternatively, only a local monitor may be deployed on the locomotive or key communication point. By including a local monitor 110 with the locomotive 105g, the asset communicator/local monitor pair 120/110 may operate as a mobile local monitor, and communicate with asset communicators 120 that are unable to communicate directly with the local monitor 110 mounted to the station 2502. Alternatively, the asset communicator/local monitor pair 120/110 may be two or more devices coupled via a wired or wireless communication link.

The asset communicators 120h-120n may operate in a "repeater" mode, where the asset communicators 120h-120n are capable of communicating through each other. In operating in the repeater mode, the asset communicators 120h-120n are capable of transmitting and receiving the information stored in their respective databases. The asset communicators 120h-120n may communicate directly with the asset communicator/local monitor pair 120/110 to form an asset communication link 130e or with another asset communicator (e.g., between asset communicators 120h and 120i) to form an asset communication link 130f. Asset communicator 120l is shown to be attempting a transmission of data with potential asset communication links 130e/f. By having the asset communicators 120h-120n communicating the data between each other and/or eventually to the asset communicator/local monitor pair 120/110, the data generated in the asset communicators 120h-120n eventually is capable of reaching the management computing system 302 via the local monitor 110.

The robust wireless communications system 100e is capable of determining the number of existing assets 105 operating on the system 100e without having direct communication links to each asset 105 (i.e., without complete coverage). Additionally, the system 100e may be able to determine the relative distances of the asset 105 from a local monitor 110. To determine the relative distances, an algorithm may be utilized to determine the number of "hops", where the number of hops refers to the number of intermediary links between the asset communicator 105i and the local monitor 110, which is three in this case. To determine the number of hops, each asset communicator 120 may perform a query to determine if a direct communication link 130i to a local monitor 110 may be established. If so, then the number of hops is determined to be one. Otherwise, upon a communication link 130e between the asset communicator 120h and the asset communicator/local monitor pair 120/110, the asset communicator 120h determines that the number of hops is two by adding one to the number of hops returned by the asset communicator/local monitor pair 120/110. The process may repeat for each of the asset communicators 120i, 120j, and 120k, for example. It should be understood that the algorithm may be performed in other ways, but that the functionality should produce the same or similar results.

Figure 26:
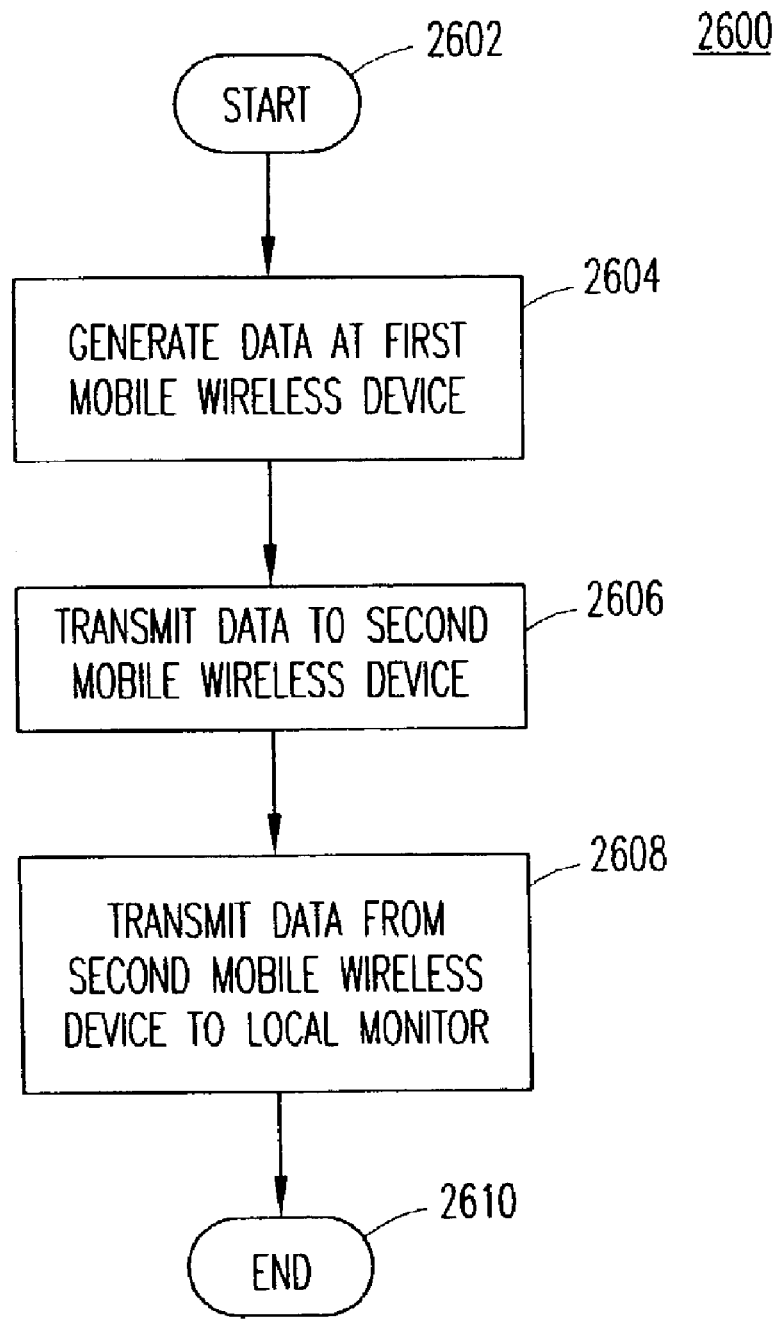
FIG. 26 is an exemplary flow diagram for managing the remotely populated assets utilizing the robust wireless communications system of FIG. 3.

FIG. 26 is an exemplary flow diagram 2600 for an indirect uplink communication with remotely populated assets utilizing the robust wireless communications system 100e according to FIG. 3. The process starts at step 2602. At step 2604, data is generated at a first mobile wireless device, such as the asset communicator 120n. The data may be stored at the first mobile wireless device until a wireless communication link is established with a second mobile wireless device or remote local monitor. At step 2606, the data is transmitted from the first mobile wireless device to the second mobile wireless device. Again, the data may be stored at the second mobile wireless device or remote local monitor until a wireless communication link is established with a third mobile wireless device or local monitor. At step 2608, the data is transmitted from the second mobile wireless device to the local monitor, where the local monitor may be mounted to a mobile asset or fixed to a structure. Accordingly, the data may be in the form of datasets, and have transaction codes associated with each dataset as per the uplink communication technique of FIG. 9. As the datasets are communicated throughout the network of mobile wireless devices and remote local monitors, the transaction codes may be used to identify the temporal relationship between datasets produced by a mobile wireless device. It should be understood that the data may be communicated, in either the uplink or downlink direction, between any two mobile wireless devices without either of the mobile wireless devices having a wireless communication link to any other mobile wireless device or local monitor 110.

To avoid having endless loops of data communicating amongst the asset communicators 120, an algorithm is provided. The algorithm utilizes a listing of asset communicators 120 or remote local monitors through which the data has passed. An asset communicator 120 or remote local monitor does not send data through any asset communicator already in the list. The asset communicators choose a nearby asset communicator 120 or remote local monitor that is deemed "closer" to the local monitor 110, where "closer" indicates that fewer communication "hops" are required to reach the local monitor 110.

The previous description is of a preferred embodiment for implementing the invention, and the scope of the invention should not necessarily be limited by this description. The scope of the present invention is instead defined by the following claims.

What is claimed is:

1. A method for providing access to a mobile asset using an access control device coupled to the mobile asset to selectively control whether the mobile asset is enabled for operation, the method comprising:

storing, in the access control device, approved operator data which identifies a group of one or more approved asset operators who are permitted to operate that mobile asset, the stored data further comprising authorization condition data associated with the group of approved asset operators, the authorization condition data specifying certain environmental conditions which must exist in order for the mobile asset to be enabled for operation;

receiving, by the access control device, from an accessing operator an operator identifier;

comparing, by the access control device, the received operator identifier to the stored approved operator data in order to confirm that the accessing operator is one of the group of approved asset operators;

comparing, by the access control device, a current environmental condition for the mobile asset to the authorization condition data in order to confirm that the specified certain environmental conditions for the group of approved asset operators to which the accessing operator belongs have been met; and controlling the mobile asset to be enabled for operation by the accessing operator if the comparisons are satisfied.

2. The method of claim 1, wherein the stored approved operator data further comprises unique password data for each approved asset operator in the group, the method further comprising:

receiving an accessing operator password; and comparing, by the access control device, the received accessing operator password to the stored approved operator data associated with the operator identifier in order to confirm that the accessing operator password matches password data associated with the operator identifier; and disabling access to the asset if the comparison determines that the operator password does not match the password data associated with the operator identifier.

3. The method of claim 1, wherein the certain environmental conditions comprise mobile asset location area and the current environmental condition comprises a current mobile asset location, and wherein comparing a current environmental condition for the mobile asset to the authorization condition data further comprises determining whether the current mobile asset location is within the mobile asset location area.

4. The method of claim 1, wherein the certain environmental conditions comprise mobile asset operation day; wherein the current environmental condition comprises a current day; and wherein comparing a current environmental condition comprises determining whether the current day matches the mobile asset operation day.

5. The method of claim 1, wherein the certain environmental conditions comprise mobile asset operation time; wherein the current environmental condition comprises a current time; and where comparing a current environmental condition comprises determining whether the current time matches the mobile asset operation time.

6. The method of claim 1, further comprising:

prompting the accessing operator, following enabling the mobile asset for operation, with a question related to operational status of the mobile asset;

receiving a response to the question; and storing the response to the question.

7. The method of claim 6, further comprising:

establishing an active communication link between the mobile asset and a wireless infrastructure;

transmitting the stored response using the active communication link over the wireless infrastructure; and if the active communication link cannot be established, maintaining the stored response to the question.

8. The method of claim 1, further comprising:
establishing an active communication link between the mobile asset and a wireless infrastructure;
receiving a question related to operational status of the mobile asset using the active communication link over the wireless infrastructure;
prompting the accessing operator, following enabling the mobile asset for operation, with the question;
receiving a response to the question; and
storing the response to the question.

9. The method of claim 1, further comprising:
determining, following enabling the mobile asset for operation, an existence of a certain operating condition of the mobile asset;
prompting the accessing operator with a question related to the certain operating condition;
receiving a response to the question; and
storing the response to the question.

10. The method of claim 9, further comprising:
establishing an active communication link between the mobile asset and a wireless infrastructure;
transmitting the stored response using the active communication link over the wireless infrastructure; and
if the active communication link cannot be established, maintaining the stored response to the question.

11. The method of claim 1, further comprising, following enabling the mobile asset for operation, monitoring utilization of the mobile asset by that accessing operator and recording information concerning that utilization.

12. The method of claim 11, wherein monitoring utilization of the mobile asset by that accessing operator and recording information concerning that utilization comprises:
generating an event start notification associated with the accessing operator starting an operation with the mobile asset;
initializing an event counter value in response to the event start notification to maintain a count associated with an operating parameter of the mobile asset as utilized by the accessing operator;
updating the event counter value until an event stop notification is received;
generating an event stop notification associated with the accessing operator stopping the operation with the mobile asset; and
storing the event counter value in association with the accessing operator identifier.

13. The method of claim 12, further comprising collecting data associated with utilization time of the mobile asset by the accessing operator.

14. The method of claim 12, further comprising:
establishing a wireless communication link; and
communicating the stored information including the event counter value over the wireless communications link.

15. The method of claim 1, further comprising gathering information from the accessing operator of the mobile asset by:
forming a list of questions for response by the accessing operator of the mobile asset;
distributing the list of questions to the access control device for the mobile asset;
prompting the accessing operator with a first question from the list of questions;
receiving a response from the accessing operator in response to the first question;
based on the response, selecting at least one additional question from the list of questions to prompt the accessing operator; and
prompting the selected additional question for the accessing operator to respond.

16. The method of claim 15, further comprising having the access control device disabling at least a portion of the mobile asset based on the response.

17. The method of claim 15, further comprising:
maintaining different lists of questions for different types of mobile assets;
determining, by the access control device, a type of mobile asset to which the access control device is coupled; and
accessing a particular one of the different lists based on the mobile asset type from which to prompt the accessing operator.

18. The method of claim 15, further comprising:
maintaining different lists of questions for different groups of potentially accessing operators;
determining the group to which the accessing operator belongs; and
accessing a particular one of the different lists based on the determined group.

19. The method of claim 15, further comprising:
maintaining different lists for different operating conditions of the mobile asset;
determining a current operating condition of the mobile asset; and
accessing a particular one of the different lists based on the determined current operating condition.

20. The method of claim 19, wherein prompting the accessing operator comprises prompting the accessing operator with a question from the particular one of the different lists in response to detecting occurrence of the corresponding current operating condition.

* * * * *